United States Patent
Khoshnevisan et al.

(10) Patent No.: US 12,490,125 B2
(45) Date of Patent: Dec. 2, 2025

(54) RESOLVING AMBIGUITIES FOR SEARCH SPACE SET LINKING FOR PHYSICAL DOWNLINK CONTROL CHANNEL REPETITION

(71) Applicant: QUALCOMM Incorporated, San Diego, CA (US)

(72) Inventors: Mostafa Khoshnevisan, San Diego, CA (US); Jing Sun, San Diego, CA (US); Tao Luo, San Diego, CA (US); Xiaoxia Zhang, San Diego, CA (US); Peter Gaal, San Diego, CA (US); Yan Zhou, San Diego, CA (US); Juan Montojo, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 262 days.

(21) Appl. No.: 17/567,989

(22) Filed: Jan. 4, 2022

(65) Prior Publication Data

US 2022/0225133 A1  Jul. 14, 2022

Related U.S. Application Data

(60) Provisional application No. 63/137,034, filed on Jan. 13, 2021.

(51) Int. Cl.
*H04W 24/08* (2009.01)
*H04W 72/0446* (2023.01)
(Continued)

(52) U.S. Cl.
CPC ....... *H04W 24/08* (2013.01); *H04W 72/0446* (2013.01); *H04W 72/0453* (2013.01); *H04W 72/1263* (2013.01); *H04W 72/23* (2023.01)

(58) Field of Classification Search
CPC ... H04W 24/08; H04W 72/23; H04W 72/046; H04W 48/12; H04L 5/0094; H04L 5/0053; H04L 1/08; H04L 5/0007; H04B 7/0408
See application file for complete search history.

(56) References Cited

U.S. PATENT DOCUMENTS

2019/0191360 A1   6/2019   Sun et al.
2019/0327767 A1   10/2019  Islam et al.
(Continued)

FOREIGN PATENT DOCUMENTS

EP      3926905 A1    12/2021
WO   WO-2020166045 A1   8/2020

OTHER PUBLICATIONS

Intel Corporation: "Multi-TRP Enhancements for PDCCH, PUCCH and PUSCH", 3GPP TSG RAN WG1 #103-e, 3GPP Draft, R1-2008978, 3rd Generation Partnership Project (3GPP), Mobile Competence Centre, 650, Route Des Lucioles, F-06921 Sophia-Antipolis Cedex, France, vol. RAN WG1, No. e-Meeting, Oct. 26, 2020-Nov. 13, 2020, 17 Pages. Oct. 24, 2020 (Oct. 24, 2020), XP051946762, Retrieved from the Internet: URL: https://ftp.3gpp.orq/tsq_ran/WG1_RL1/TSGR1_103-e/Docs/R1-2008978.zip R1-2008978.docx [retrieved on Oct. 24, 2020] Sections 2.6-2.11.
(Continued)

*Primary Examiner* — Mahran Y Abu Roumi
(74) *Attorney, Agent, or Firm* — Holland & Hart LLP

(57) ABSTRACT

Methods, systems, and devices for communications management are described. In one example, a method for wireless communication at a user equipment (UE) is described. The method may include receiving a configuration of a first search space (SS) set and a second SS set and identifying a link between the first SS set and the second SS set for physical downlink control channel repetition. The method may also include identifying one or more monitor-
(Continued)

ing occasions in the first SS set or the second SS set to monitor for downlink control information based at least in part on an overlap rule associated with the link between the first SS set and the second SS set for physical downlink control channel repetition. The method may include monitoring the identified one or more monitoring occasions in at least the first SS set or the second SS set for the downlink control information.

58 Claims, 13 Drawing Sheets

(51) Int. Cl.
  *H04W 72/0453* (2023.01)
  *H04W 72/1263* (2023.01)
  *H04W 72/23* (2023.01)

(56) References Cited

U.S. PATENT DOCUMENTS

| | | | |
|---|---|---|---|
| 2020/0260449 A1* | 8/2020 | Suzuki | H04L 5/0007 |
| 2020/0336928 A1 | 10/2020 | Seo et al. | |
| 2020/0413412 A1* | 12/2020 | Kim | H04W 24/08 |
| 2023/0180254 A1* | 6/2023 | Cirik | H04L 5/0044 370/329 |
| 2023/0413081 A1* | 12/2023 | Zhang | H04L 5/0035 |

OTHER PUBLICATIONS

International Search Report and Written Opinion—PCT/US2022/070039—ISA/EPO—Apr. 13, 2022.
Taiwan Search Report—TW111100418—TIPO—May 16, 2025.
CATT: "Discussion on Enhancements on Multi-TRP/panel for PDCCH, PUCCH and PUSCH", R1-2007825, 3GPP TSG RAN WG1 Meeting #103-e e-Meeting, Oct. 26-Nov. 13, 2020, 17 Pages.

* cited by examiner

RESOLVING AMBIGUITIES FOR SEARCH SPACE SET LINKING FOR PHYSICAL DOWNLINK CONTROL CHANNEL REPETITION

CROSS REFERENCE

The present application for patent claims the benefit of U.S. Provisional Patent Application No. 63/137,034 by KHOSHNEVISAN et al., entitled "RESOLVING AMBIGUITIES FOR SEARCH SPACE SET LINKING FOR PHYSICAL DOWNLINK CONTROL CHANNEL REPETITION," filed Jan. 13, 2021, assigned to the assignee hereof, and expressly incorporated by reference herein.

FIELD OF TECHNOLOGY

The following relates to communications management, including resolving ambiguities for search space set linking for physical downlink control channel repetition.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some NR systems, two search space sets associated with the same control resource set (CORESET) may overlap, meaning that they have overlapping resource blocks, use the same scrambling, and have the same transmission configuration indicator (TCI) state. If a monitoring occasion of the first search space set overlaps with a monitoring occasion of the second search space set, a first physical downlink control channel (PDCCH) candidate in the first search space set may have exactly the same control channel elements (CCEs) (e.g., the same resources) as a second PDCCH candidate in the second search space set. When this happens, if the corresponding downlink control information (DCI) formats of the first and second PDCCH candidates have the same size, the PDCCH candidate in the second search space set may not be counted for monitoring towards blind decoding. Both of the PDCCH candidates are considered as one PDCCH candidate, even though they are in different search space sets. These and other circumstances may lead to ambiguities for the communications system.

SUMMARY

The described techniques relate to improved methods, systems, devices, and apparatuses that support resolving ambiguities for search space set linking for physical downlink control channel repetition. Generally, the described techniques provide for various techniques to resolve PDCCH ambiguity. The ambiguities may relate to two or more monitoring occasions being linked together where the search space sets have the same CORESET, a third monitoring occasion of a third search space set being linked to one of the search space sets, whether the UE can skip decoding a DCI from a linked monitoring occasion if a DCI from the other linked monitoring occasion is already decoded, whether a third monitoring occasion of a search space set can be linked with two separate monitoring occasions of two other search space sets, and whether two monitoring occasions of a single search space set can be linked to a monitoring occasion of another search space set. Techniques described herein provide several solutions to these potential ambiguities.

A method for wireless communication at a UE is described. The method may include receiving a configuration of a first search space set and a second search space set and identifying a link between the first search space set and the second search space set for PDCCH repetition. The method may also include identifying one or more monitoring occasions in the first search space set or the second search space set to monitor for DCI based on an overlap rule associated with the link between the first search space set and the second search space set for PDCCH repetition. The method may also include monitoring the identified one or more monitoring occasions in at least the first search space set or the second search space set for the DCI.

An apparatus for wireless communication at a UE is described. The apparatus may include a processor, memory in electronic communication with the processor, and instructions stored in the memory. The instructions may be executable by the processor to cause the apparatus to receive a configuration of a first search space set and a second search space set and identify a link between the first search space set and the second search space set for PDCCH repetition. The instructions may also be executable by the processor to cause the apparatus to identify one or more monitoring occasions in the first search space set or the second search space set to monitor for DCI based on an overlap rule associated with the link between the first search space set and the second search space set for PDCCH repetition. The instructions may be executable by the processor to cause the apparatus to monitor the identified one or more monitoring occasions in at least the first search space set or the second search space set for the DCI.

Another apparatus for wireless communication at a UE is described. The apparatus may include means for receiving a configuration of a first search space set and a second search space set and means for identifying a link between the first search space set and the second search space set for PDCCH repetition. The apparatus may also include means for identifying one or more monitoring occasions in the first search space set or the second search space set to monitor for DCI based on an overlap rule associated with the link between the first search space set and the second search space set for PDCCH repetition and means for monitoring the identified one or more monitoring occasions in at least the first search space set or the second search space set for the DCI.

A non-transitory computer-readable medium storing code for wireless communication at a UE is described. The code may include instructions executable by a processor to receive a configuration of a first search space set and a second search space set and identify a link between the first search space set and the second search space set for PDCCH repetition. The code may further include instructions executable by a processor to identify one or more monitoring occasions in the first search space set or the second search space set to monitor for DCI based on an overlap rule associated with the link between the first search space set and the second search space set for PDCCH repetition and monitor the identified one or more monitoring occasions in at least the first search space set or the second search space set for the DCI.

Some examples of the method, apparatuses, and non-transitory computer-readable medium described herein may further include operations, features, means, or instructions for determining that no monitoring occasion of the first search space set overlaps with a monitoring occasion of the second search space set based on the overlap rule.

Some examples of the method, apparatuses, and non-transitory computer-readable medium described herein may further include operations, features, means, or instructions for determining that the first search space set and the second search space set may be associated with a CORESET.

Some examples of the method, apparatuses, and non-transitory computer-readable medium described herein may further include operations, features, means, or instructions for determining that there may be no other search space set linked with the first search space set or the second search space set.

Some examples of the method, apparatuses, and non-transitory computer-readable medium described herein may further include operations, features, means, or instructions for identifying a third search space set having a same monitoring occasion as the first search space set and monitoring the identified one or more monitoring occasions for the first search space set, the second search space set, and the third search space set based on the overlap rule.

In some examples of the method, apparatuses, and non-transitory computer-readable medium described herein, the overlap rule defines to monitor the identified one or more monitoring occasions for first search space set, the second search space set, and the third search space set independently.

Some examples of the method, apparatuses, and non-transitory computer-readable medium described herein may further include operations, features, means, or instructions for determining that the first search space set may be associated with a first CORESET and the third search space set may be associated with a second CORESET different from the first CORESET, where the overlap rule defines to monitor for the DCI in the first search space set and monitor for a second DCI in the third search space set.

Some examples of the method, apparatuses, and non-transitory computer-readable medium described herein may further include operations, features, means, or instructions for determining that the first search space set may have a downlink control format of a first size and that the third search space set may have a downlink control format of a second size different from the first size, where the overlap rule defines to monitor for the DCI in the first search space set and monitor for a second DCI in the third search space set.

Some examples of the method, apparatuses, and non-transitory computer-readable medium described herein may further include operations, features, means, or instructions for identifying a link between the third search space set and a fourth search space set for PDCCH repetition and identifying that a monitoring occasion in the second search space set overlaps with a monitoring occasion in the fourth search space set, where the overlap rule defines to monitor for the DCI in the first search space set and monitor for a second DCI in the third search space set.

In some examples of the method, apparatuses, and non-transitory computer-readable medium described herein, the first search space set and the third search space set may have a same CORESET and a same downlink control format size.

In some examples of the method, apparatuses, and non-transitory computer-readable medium described herein, the third search space set may be not linked with a fourth search space set.

In some examples of the method, apparatuses, and non-transitory computer-readable medium described herein, the overlap rule indicates to treat a DCI in the third search space set based on an assumption that the third search space set may be linked with the second search space set.

Some examples of the method, apparatuses, and non-transitory computer-readable medium described herein may further include operations, features, means, or instructions for linking the third search space set with the second search space set, where the overlap rule indicates to treat the monitoring occasion of the second search space set as linked with the monitoring occasion of the third search space set.

Some examples of the method, apparatuses, and non-transitory computer-readable medium described herein may further include operations, features, means, or instructions for dropping a monitoring occasion of the third search space set, where the overlap rule determines to monitor a monitoring occasion of the first search space set.

Some examples of the method, apparatuses, and non-transitory computer-readable medium described herein may further include operations, features, means, or instructions for dropping a monitoring occasion of the first search space set, where the overlap rule determines to monitor a monitoring occasion of the third search space set.

Some examples of the method, apparatuses, and non-transitory computer-readable medium described herein may further include operations, features, means, or instructions for comparing a first index of the first search space set with a second index of the third search space set and dropping a monitoring occasion of the first search space set or the third search space set based on the comparison, where the overlap rule determines to monitor the search space set based on the comparison.

Some examples of the method, apparatuses, and non-transitory computer-readable medium described herein may further include operations, features, means, or instructions for dropping a PDCCH candidate of a monitoring occasion of the first search space set or of a monitoring occasion of the third search space set, where the overlap rule determines to monitor the PDCCH candidate of the monitoring occasion of the first search space set or the monitoring occasion of the third search space set that may be retained.

Some examples of the method, apparatuses, and non-transitory computer-readable medium described herein may further include operations, features, means, or instructions for determining that a monitoring occasion of the first search space set overlaps with a monitoring occasion of the second search space set and monitoring for the DCI in the first search space set, where the overlap rule indicates to treat the monitoring occasion of the second search space set as unlinked with the monitoring occasion of the first search space set.

Some examples of the method, apparatuses, and non-transitory computer-readable medium described herein may further include operations, features, means, or instructions for determining that a monitoring occasion of the first search space set overlaps with a monitoring occasion of the second search space set, where the overlap rule determines to ignore the overlapping monitoring occasions.

Some examples of the method, apparatuses, and non-transitory computer-readable medium described herein may further include operations, features, means, or instructions for monitoring the DCI in at least the first search space set or the second search space set further includes skipping monitoring the monitoring occasion of the first search space set and the monitoring occasion of the second search space set according to the overlap rule.

Some examples of the method, apparatuses, and non-transitory computer-readable medium described herein may further include operations, features, means, or instructions for dropping a PDCCH candidate of a monitoring occasion of the first search space set.

Some examples of the method, apparatuses, and non-transitory computer-readable medium described herein may further include operations, features, means, or instructions for determining that a first PDCCH candidate and a second PDCCH candidate may have a same DCI payload, a same downlink control format size, and a same radio network temporary identifier and where monitoring the identified one or more monitoring occasions further includes monitoring the first PDCCH candidate in the first search space set and the second PDCCH candidate in the second search space set based on the determining.

Some examples of the method, apparatuses, and non-transitory computer-readable medium described herein may further include operations, features, means, or instructions for receiving a configuration of a radio resource control parameter, where the overlap rule may be based on the radio resource control parameter.

Some examples of the method, apparatuses, and non-transitory computer-readable medium described herein may further include operations, features, means, or instructions for determining that a third search space set may be linked with the first search space set, detecting the DCI in the one or more monitoring occasions, and determining scheduling information according to the overlap rule.

In some examples of the method, apparatuses, and non-transitory computer-readable medium described herein, the overlap rule may be based on a last symbol of a PDCCH candidate for the search space set of the first, second, or third search space sets that occurs last in time or may have a higher index.

In some examples of the method, apparatuses, and non-transitory computer-readable medium described herein, the overlap rule may be further based on the DCI being associated with the first search space set.

In some examples of the method, apparatuses, and non-transitory computer-readable medium described herein, the overlap rule skips monitoring a second monitoring occasion of the first search space set that may be linked with a first monitoring occasion of the second search space set.

Some examples of the method, apparatuses, and non-transitory computer-readable medium described herein may further include operations, features, means, or instructions for determining that a second monitoring occasion of the first search space set is not linked with a first monitoring occasion of the second search space set based at least in part on a first monitoring occasion of the first search space set being linked with the first monitoring occasion of the second search space set.

Some examples of the method, apparatuses, and non-transitory computer-readable medium described herein may further include operations, features, means, or instructions for determining that a first monitoring occasion and a second monitoring occasion of the first search space set may be linked with a monitoring occasion of the second search space set, detecting the DCI in the one or more monitoring occasions, and determining scheduling information according to the overlap rule, where the overlap rule may be based on a last symbol of a PDCCH candidate for the first monitoring occasion of the first search space set, the monitoring occasion of the second search space set, or the second monitoring occasion of the first search space set that occurs last in time.

In some examples of the method, apparatuses, and non-transitory computer-readable medium described herein, the overlap rule may be further based on the detecting the DCI in the monitoring occasion of the second search space set.

DETAILED DESCRIPTION

Figure 1:
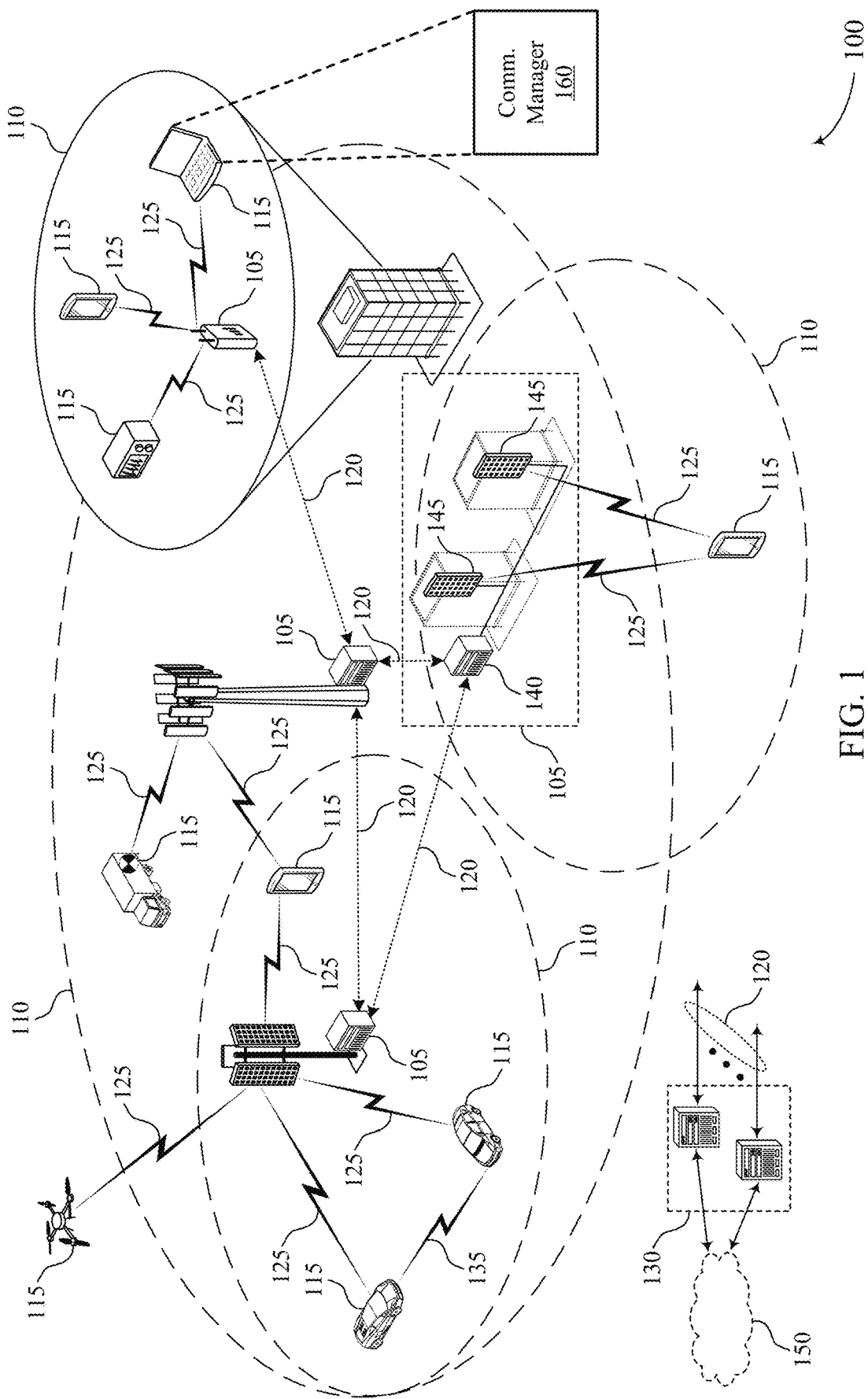
FIG. 1 illustrates an example of a wireless communications system that supports resolving ambiguities for search space set linking for physical downlink control channel repetition in accordance with aspects of the present disclosure.

The described techniques relate to improved methods, systems, devices, and apparatuses that support resolving ambiguities for search space set linking for PDCCH repetition. PDCCH repetition may be used, for example, to increase reliability. A network may use two different beams to transmit repeated PDCCH for redundancy. If one beam is blocked or the aggregation level is too small, the UE may potentially be able to decode the DCI from the other beam. However, some of the scheduling information in the DCIs may not be just from the payload of the DCI, but may be a function of which PDCCH candidate is decoded. Because of this, it may be important for the network and the UE to know which DCI the UE has decoded. However, PDCCH repetition may cause several ambiguities to arise.

The DCI detected in two linked search space sets for PDCCH repetition may be interpreted differently than DCI detected in unlinked search space sets. When a UE is configured for PDCCH repetition, the UE may only decode one of the repetitions or both when soft combined. If the DCI is decoded, the network doesn't know which DCI the UE decoded (which single DCI or if both were decoded for soft combining). Because the scheduling information that the UE determines from the DCI may also be a function of the time or resources where the DCI is detected, it is desirable to be able to resolve the ambiguities. Different overlap rules are proposed to resolve these ambiguities.

Generally, the described techniques provide for various ways to resolve PDCCH ambiguities. A first ambiguity may relate to two or more monitoring occasions being linked together where the search space sets have the same CORE-SET. To resolve this ambiguity, the UE may either give an error if the monitoring occasions overlap or the UE may not monitor the overlapping monitoring occasion.

A second ambiguity may relate to a third monitoring occasion of a third search space set being linked with one of the first and second search space sets. In some examples, the UE may not expect a third search space set to overlap the first search space set unless certain conditions apply. Those conditions may include that the third search space set and the first search space set are associated with different CORE-SETs, if the third search space set and the first search space set have different control information format sizes, or if the third search space set is linked with a fourth search space set. Alternatively, if those conditions are not satisfied, then the UE may assume that the third search space set is linked with the second search space set, ignore the monitoring occasion of the third search space set, or ignore the monitoring occasion of the first search space set. In some examples, which monitoring occasion that the UE ignores may be based on an index of the search space sets. These examples may also be at or determined on a PDCCH candidate level.

A third ambiguity may arise when the UE decodes a DCI from a linked monitoring occasion. Techniques described herein enable the UE to skip decoding the second DCI from a linked monitoring occasion if the first DCI from the other linked monitoring occasion is already decoded. Skipping decoding the second DCI may result in power savings at the UE. Having a different DCI can be assessed by having different DCI payloads including different DCI format sizes, different DCI formats, or different radio network temporary identifiers.

A fourth ambiguity relates to whether a third monitoring occasion of a third search space set can be linked with two separate monitoring occasions of two other search space sets. In some examples, the UE does not expect that there would be a third search space set linked with the first search space set. Other techniques enable to UE to consider a DCI in a third monitoring occasion to be linked to the first search space set. Which DCI the UE may use for the scheduling information may be determined according to a last symbol rule or an index rule.

A fifth ambiguity relates to whether two monitoring occasions of a single search space set can be linked to a monitoring occasion of another search space set. Some techniques describe that the UE does not expect a second monitoring occasion of the first search space set to be linked with the monitoring occasion of the second search space set. Alternative techniques describe that if a second monitoring occasion of the first search space set is also linked with the monitoring occasion of the second search space set, a detected DCI in any of the monitoring occasions may be interpreted according to a rule that considers all three monitoring occasions. Which DCI to use may be determined according to a last symbol rule or an index rule. These examples may also apply at the PDCCH candidate level.

Aspects of the disclosure are initially described in the context of wireless communications systems. Aspects of the disclosure are further illustrated by and described with reference to a swim diagram and block diagrams. Aspects of the disclosure are further illustrated by and described with reference to apparatus diagrams, system diagrams, and flowcharts that relate to resolving ambiguities for search space set linking for physical downlink control channel repetition.

FIG. 1 illustrates an example of a wireless communications system 100 that supports resolving ambiguities for search space set linking for physical downlink control channel repetition in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of CCEs associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A UE 115 may include a communications manager 160. The communications manager 160 may receive a configuration of a first search space set and a second search space set. The communications manager 160 may identify a link between the first search space set and the second search space set for physical downlink control channel repetition. The communications manager 160 also may identify one or more monitoring occasions in the first search space set or the second search space set to monitor for downlink control information based at least in part on an overlap rule associated with the link between the first search space set and the second search space set for physical downlink control channel repetition. The communications manager 160 also may monitor the identified one or more monitoring occasions in at least the first search space set or the second search space set for the downlink control information.

The communications manager 160 may resolve ambiguities at the UE 115 regarding PDCCH repetition. The communications manager 160 may improve reliability of communications, reduce complexity, reduce retransmissions, reduce latency, improve throughput, and improve power savings at the UE 115.

Figure 2:
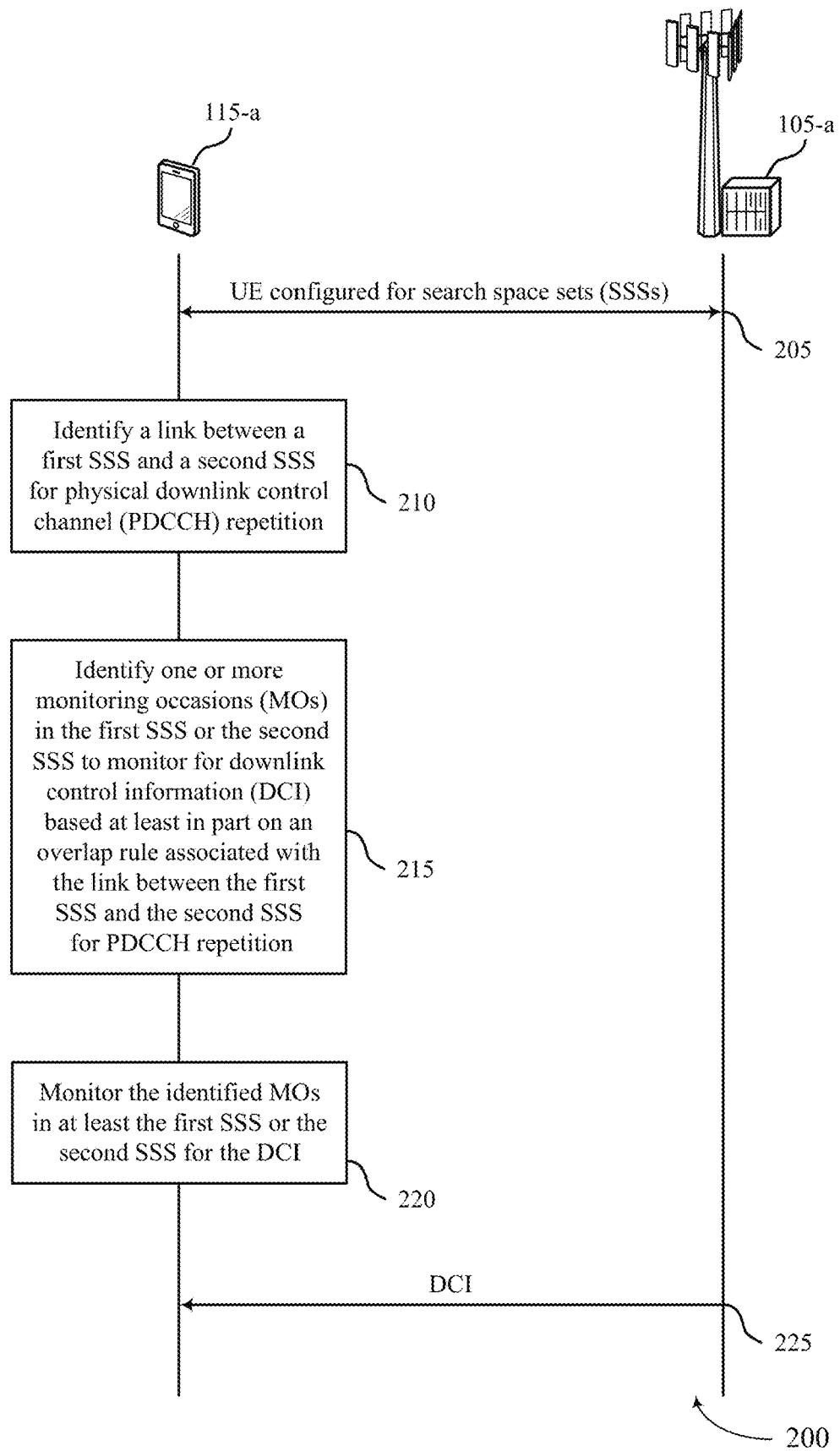
FIG. 2 illustrates an example of a diagram that supports resolving ambiguities for search space set linking for physical downlink control channel repetition in accordance with aspects of the present disclosure.

FIG. 2 illustrates an example of a diagram 200 that supports resolving ambiguities for search space set linking for physical downlink control channel repetition in accordance with aspects of the present disclosure. The diagram 200 may implement various aspects of the wireless communications system 100 or may be implemented by various aspects of the wireless communications system 100, among other examples. The diagram 200 may include a UE 115-*a* and a base station 105-*a*. The UE 115-*a* may be an example of aspects of a UE 115 as described herein. The base station 105-*a* may be an example of aspects of a base station 105 as described herein.

At 205, the UE 115-*a* may be configured for two or more search space sets. In some examples, the base station 105-*a* may configure the UE 115-*a* for the search space sets. In other examples, the UE 115-*a* configures itself for the search space sets according to a specification. When configuring PDCCH, the UE 115-*a* can have up to three or five CORESETs in a given bandwidth part for a component carrier. The CORESETs may be used to configure the PDCCH. Properties of CORESETs may include a TCI state for PDCCH, resource blocks in the frequency domain, and a number of symbols in the time domain. Other properties of a CORESET may include a CCE resource element group (REG) bundle mapping type, precoding granularity, and scrambling identifier (ID). These parameters may be used for a PDCCH demodulation reference signal (DMRS) or coded bits of DCI content. In some examples the CCE-REG bundling mapping type may be the same as a REG bundle for narrowband channel estimation or wideband precoding in the entire CORESET.

Once the CORESETs are configured, one or more search space sets may also be configured for monitoring PDCCH. The UE 115-$a$ may be configured with up to ten search space sets in a given BWP, in some examples. As part of the configuration of the search space sets, each search space set may be associated with a given CORESET, which may be identified. The number of symbols may be the only time domain behavior in the CORESET, but which slot and symbol may be used for the PDCCH may be part of the configuration of the search space set.

The search space sets may be configured for the time domain, monitoring occasions of the PDCCH, and a periodicity (e.g., a number of slots) and an offset to determine which slots are monitored. The periodicity (denoted as $k_s$ slots) and offset (denoted as $o_s$ slots) may be configured using a parameter monitoringSlotPeriodicityAndOffset in units of slots. For example, if the periodicity is five slots ($k_s$=5 slots), there may be one search space for each period (e.g., there is at least one slot in the five slots where the search space exists).

The search space sets may also be configured with a parameter duration (denoted $T_s$), which may show in how many slots the search space set exists (e.g., $T_s<k_s$). If the parameter duration is two, then in each periodicity of five slots, the search space set exists in two of the slots.

In each slot that the search space set exists, a PDCCH monitoring pattern within a slot may be indicated by a parameter MonitoringSymbolsWithinSlot. The PDCCH monitoring pattern may be a bitmap of fourteen symbols and every 1 in the bitmap (e.g., 010000100000, etc.) may indicate the first symbol of the CORESET for that monitoring occasion. If there are three 1s in the bitmap, then there are three monitoring occasions in the slot, and the location of the 1s indicate the first symbol of the CORESET for that monitoring occasion. For example, if it is assumed that the search space set has three symbols, then there are three monitoring occasions for each slot of the PDCCH in which the search space set is monitored.

A type of search space set can be UE-specific or a common search space set type. The configuration at 205 may also configure which DCI formats the UE 115-$a$ is to monitor.

At 205, the PDCCH candidates may also be configured as part of the search space set configuration. For example, a number of PDCCH candidates may be configured for each aggregation level.

For PDCCH repetition, each repetition may be a PDCCH candidate. Two PDCCH candidates may be linked together for a possible repetition of the same DCI. Two PDCCH candidates should have the same aggregation level (e.g., same number of CCEs) and the DCI payload transmitted by the two PDCCH candidates are the same. Therefore, the UE 115-$a$ can perform soft combining to decode the DCI, using the two PDCCH candidates (e.g., the two PDCCH repetitions). In some examples, two PDCCH candidates in different search space sets (e.g., associated with different CORESETs) may be linked together for PDCCH repetition.

For example, the UE 115-$a$ can use different search space set, which are configured to be linked together, for repetition. For example, a search space set with index 2 may be linked with a search space set with index 4. Each search space set has a different monitoring occasion (e.g., within a slot or across a slot). For PDCCH repetition and monitoring occasion, a monitoring occasion of a first search space set may be associated or linked with a monitoring occasion of a second search space set. Techniques described herein provide a mechanism (e.g., rule based, or configuration based) so that the UE 115-$a$ can resolve ambiguities that arise from PDCCH repetition.

For linking two PDCCH candidates, which may occur within a first monitoring occasion of the first search space set and a second monitoring occasion of the second search space set, one or more of several methods for linking may be used. For example, two PDCCH candidates with the same candidate index across the two search space set may be linked. In another example, two PDCCH candidates with the same start CCEs may be linked. In other examples, the linking may be explicitly provided as a radio resource control (RRC) configuration. The RRC configuration may identify which candidate in a first search space set is linked with which candidate in a second search space set, which may be configured to the UE 115-$a$. For example, a candidate index in a certain search space set may be linked with another candidate index in a second search space set.

In some examples, the DCI detected in the two linked search space sets for PDCCH repetition may be interpreted differently than DCI detected in unlinked search space sets. When the UE 115-$a$ is configured for PDCCH repetition, the UE 115-$a$ may only decode one of the repetitions (e.g., the first or the second) or may decode both when soft combined. If the DCI is decoded, the network doesn't know which of these scenarios happened. That is, the base station 105-$a$ may not know which DCI the UE 115-$a$ decoded or if the UE 115-$a$ used soft combining. However, the information that the UE 115-$a$ determines as a result of the PDCCH format detection may not only be a function of the DCI payload but also a function of the time or resources where the DCI is detected. For example, the last or first symbol of the DCI that is used as a reference may affect the scheduling information, which may cause some ambiguity. In contrast, if the scheduling information was directly in the DCI payload, then there would be no ambiguity because once one of the instances of the DCI is decoded, the UE 115-$a$ would have all of the information. However, because some of these rules described above are not a function of the DCI payload but also a function of the resources in terms of time and frequency of the DCI, then there could be some ambiguity because the base station 105-$a$ would not know which resources were used. That is, the base station 105-$a$ would not know whether the UE 115-$a$ decoded the first DCI repetition, the second DCI repetition, or the soft combined DCI.

Some examples of how the scheduling information that the UE 115-$a$ determines may be a function of the time and resources where the DCI detected is as follows. For example, the slot offset for the scheduled physical downlink shared channel (PDSCH), a physical uplink shared channel (PUSCH), a channel state information reference signal (CSI-RS), or a sounding reference signal (SRS) may be applied to a reference, which may be the slot in which the scheduling DCI is detected. The slot offset may be indicated in the DCI itself, but the reference time to start counting at the offset would be started from the slot in which the DCI is detected.

Another example of how the scheduling information may be a function of the time and resources where the DCI is detected may include which physical uplink control channel (PUCCH) resources to use for a HARQ acknowledgement (ACK) may be a function of a start CCE of the detected PDCCH and the number of CCEs of the CORESET in which the PDCCH is detected.

Another example of how the scheduling information may be a function of the time and resources where the DCI is detected relates to the UE 115-*a* determining whether the scheduled PDSCH should be received based on a default beam or based on an indicated beam in the DCI. To make this determination, the UE 115-*a* may compare the scheduling offset between the end of the DCI and the beginning of the PDCCH to a threshold. The threshold may be a UE capability threshold in terms of a beam switch capability. If the scheduling offset is less than the threshold, the UE 115-*a* may apply a default beam. If it is larger, then the UE 115-*a* may use the indicated beam.

In another example, the UE 115-*a* may rate match the scheduled PDSCH around the resources of the scheduling DCI in the case of resource overlap. In some examples, when the PDSCH is scheduled, if the DCI resources that scheduled that PDSCH overlap with PDSCH resources, then the PDSCH may be rate matched around the resources of the scheduling DCI.

Because the scheduling information may be partially based on the resources used as shown above, in order to avoid ambiguity between the UE 115-*a* and the base station 105-*a* in the case of PDCCH repetition, some rules or configuration may be helpful irrespective of which, or both, of the two linked candidates the UE 115-*a* actually decoded. For cases that the time of the detected DCI is used as a reference (e.g., the first symbol or the last symbol), the first or the last symbol of the earlier or later PDCCH candidate should be used. Some rules may define that the first symbol or the last symbol of the earlier PDCCH candidate should be used. Other rules may define that the first symbol or the last symbol of the later PDCCH candidate should be used. For other cases (e.g., rate matching), both candidates may be considered (e.g., the PDSCH may be rate matched around both linked PDCCH candidates). Additionally, some other rules may be based at least in part on the index of the first or second search space set (e.g., the candidate in the search space set with the higher or lower index is considered to determine some scheduling information), for example, for start CCE and a number of CCEs for PUCCH resource determination. There may be other rules that define additional or alternative information besides the DCI payload information to determine scheduling information.

Despite which rules are used, the DCI detected in the two linked search space sets when PDCCH repetition is used could be interpreted differently compared to the DCI without PDCCH repetition. When a DCI is transmitted via PDCCH repetition, there may be several alternatives for PUCCH resource determination of HARQ-ACK when the corresponding PUCCH resource set has a size larger than eight. First, the UE 115-*a* may ensure that the same start CCE index (which may be based at least in part on the linking options) and the same number of CCEs in the two CORESETs (based at least in part on the CORESET configuration restriction). In another example, the start CCE index and the number of CCEs in the CORESET of one of the linked PDCCH candidates may be applied. In another example, it may be up to the UE 115-*a* to determine the PUCCH resource based at least in part on the starting CCE index and the number of CCEs in the CORESET of any of the two linked PDCCH candidates. In other examples, other rules may be used. Once the one candidate is fixed and known by both the UE 115-*a* and the base station 105-*a*, then there is no ambiguity for the PDCCH repetition.

Returning to FIG. 2, the UE 115-*a* may be configured for PDCCH repetition at 205. Because there may be ambiguities resulting from the PDCCH repetition, the UE 115-*a* may use one or more of several techniques for resolving the ambiguity. These different techniques for resolving ambiguity may be referred to as overlap rules. The overlap rules may apply at the monitoring occasion level or at a PDCCH candidate level.

At 210, the UE 115-*a* may identify a link between a first search space set and a second search space set for PDCCH repetition. The link may associate one or more monitoring occasions of each search space set together.

At 215, the UE 115-*a* may identify one or more monitoring occasions in the first search space set or the second search space set to monitor for DCI based at least in part on an overlap rule associated with the link between the first search space set and the second search space set for physical downlink control channel repetition. Different overlap rules are contemplated and discussed below with respect to FIGS. 3-8. At 220, the UE 115-*a* may monitor the identified monitoring occasions in at least the first search space set or the second search space set for the DCI.

For example, if both of the linked search space sets for the UE 115-*a* are associated with the same CORESET, the UE 115-*a* may either give an error if the monitoring occasions overlap or the UE 115-*a* may not monitor the overlapping monitoring occasion.

In another example, when the first search space set is linked with the second search space set for PDCCH repetition, the UE 115-*a* may not expect a third search space set to overlap with a monitoring occasion of the first search space set unless certain conditions apply. Those conditions may include that the third search space set and the first search space set are associated with different CORESETs or have different control information format sizes or if the third search space set is linked with a fourth search space set. Alternatively, if those conditions are not satisfied, then the UE 115-*a* may assume that the third search space set is linked with the second search space set, the UE 115-*a* may ignore the monitoring occasion of the third search space set, or the UE 115-*a* may ignore the monitoring occasion of the first search space set. In some examples, which monitoring occasion the UE 115-*a* ignores may be based at least in part on an index of the search space set. These examples may also be at or determined on the PDCCH candidate level, which is one level inside the monitoring occasion.

In other examples, the UE 115-*a* may have two linked search space sets, decode just one, and skip the next one for power savings. In this example, the UE 115-*a* may have to assume that the two linked candidates have the same DCI. Having a different DCI can be assessed by having different DCI payloads including different DCI format sizes, different DCI formats, or different radio network temporary identifiers.

Other examples provide clarity to whether a first search space set can be linked to a second search space set and a third search space set. In one option, the UE 115-*a* does not expect that there is a third search space set linked with the first search space set. Alternatively, if the first search space set and the third search space set are linked, if the UE 115-*a* detects another DCI, the UE 115-*a* may consider it linked to the first search space set. Which DCI to use may be determined according to a last symbol rule or an index rule. In some examples, which DCI to use may also be conditioned on the UE 115-a detecting a DCI from the first search space set.

Another example addresses the ambiguity of whether, if a first monitoring occasion of a first search space set and a monitoring occasion of second search space set are linked, can a second monitoring occasion of the first search space set be linked with the monitoring occasion of the second search space set. In one option, the UE 115-a does not expect a second monitoring occasion of the first search space set to be linked with the monitoring occasion of the second search space set. Alternatively, if a second monitoring occasion of the first search space set is also linked with the monitoring occasion of the second search space set, a detected DCI in any of the monitoring occasions is interpreted according to a rule that considers all three monitoring occasions. Which DCI to use may be determined according to a last symbol rule or an index rule. In some examples, which DCI to use may also be conditioned on the UE 115-a detecting a DCI from the first search space set. These examples may also apply at the PDCCH candidate level.

Whichever technique the UE 115-a uses to resolve PDCCH repetition ambiguity, the UE 115-a may monitor the identified one or more monitoring occasions in at least the first search space set or the second search space set for the downlink control information at 220. The base station 105-a may transmit the DCI to the UE 115-a at 225, and the monitoring UE 115-a may detect the DCI.

The techniques described herein may resolve ambiguity at the UE 115-a and the base station 105-a regarding PDCCH repetition. The techniques may improve reliability of communications, reduce retransmissions, reduce latency, improve throughput, and improve power savings at the UE 115-a.

Figure 3:
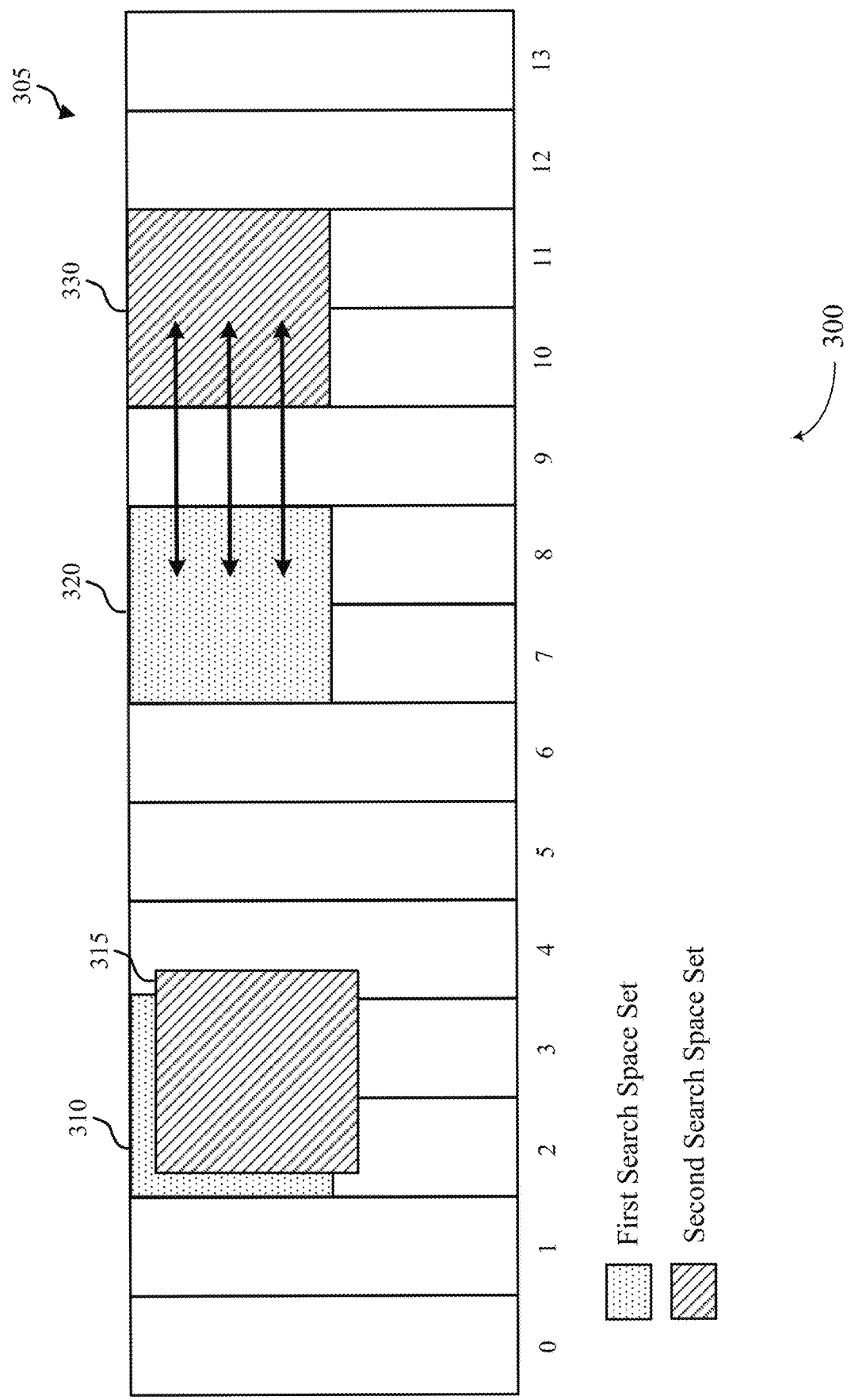
FIGS. 3 to 8 illustrate example block diagrams that support resolving ambiguities for search space set linking for physical downlink control channel repetition in accordance with aspects of the present disclosure.

FIG. 3 illustrates an example of a block diagram 300 that supports resolving ambiguities for search space set linking for physical downlink control channel repetition in accordance with aspects of the present disclosure. The block diagram 300 may implement various aspects of the wireless communications system 100 or may be implemented by various aspects of the wireless communications system 100, among other examples. The block diagram 300 shows a slot 305 of 14 symbols.

The slot 305 may be scheduled to have a first monitoring occasion 310 of a first search space set and a first monitoring occasion 315 of a second search space set. In the example of FIG. 3, the first monitoring occasion 310 and the first monitoring occasion 315 overlap. The slot 305 may also have a second monitoring occasion 320 of the first search space set and a second monitoring occasion 330 of the second search space set.

If two search space sets are associated with the same CORESET (e.g., the same resource blocks, same scrambling, and same TCI state) and the first monitoring occasion 310 of the first search space set overlaps with the first monitoring occasion 315 of the second search space set, it is possible that a first PDCCH candidate in the first search space set has exactly the same CCEs as a second PDCCH candidate in the second search space set. In such a case, if the corresponding DCI formats for the PDCCH candidates have the same size, the PDCCH candidate in the second search space set (e.g., the search space set with the higher index) is not counted for monitoring towards the blind decoding limit because the UE needs to perform only one blind decoding for those CCEs (because they have the same resource, same scrambling, same TCI, same DCI size). This may happen when the search space sets are associated with the same CORESET and also if the CCEs are the same and have the same DCI format. Both of the DCIs are considered as one PDCCH candidate even though they are in different search space sets. In this example, the two PDCCH candidates may not be used for repetition because there is only one blind decoding at the UE because the parameters are the same. Techniques are provided to resolve this ambiguity.

In some examples, if the UE is configured with the two linked search space sets for PDCCH repetition and both search space sets are associated with the same CORESET, the UE may expect that no monitoring occasion of the first search space set overlaps with a monitoring occasion of the second search space set. If both of them are associated with the same CORESET, then the monitoring occasion should not overlap. If there is an overlap, the UE may determine it to be an error case according to the overlap rule. The first example of the first monitoring occasions 310 and 315 overlapping would therefore be an error case. In contrast, the monitoring occasions 320 and 330 do not overlap, therefore the UE may process them (e.g., they may have different CORESETs).

In some examples, the UE may determine that no monitoring occasion of the first search space set overlaps with a monitoring occasion of the second search space set based at least in part on the overlap rule. The UE may determine that the first search space set and the second search space set are associated with a control resource set.

In some examples, if the UE is configured with the two linked search space sets for PDCCH repetition and both search space sets are associated with the same CORESET, the UE may assume that there is no PDCCH repetition in that monitoring occasion according to the overlap rule. The UE may monitor the PDCCH but ignore the linkage between the two search space sets. In another example, the UE may not monitor for the PDCCH in that monitoring occasion.

In some examples, the UE may determine that the first monitoring occasion 310 of the first search space set overlaps with the first monitoring occasion 315 of the second search space set. The UE may monitor for the DCI in the first search space set, wherein the overlap rule indicates to treat the first monitoring occasion 315 of the second search space set as unlinked with the first monitoring occasion 310 of the first search space set. In other examples, the overlap rule configures or instructs the UE to ignore the overlapping first monitoring occasions 310 and 315. In some examples, the UE may monitor the DCI in at least the first search space set or the second search space set and the UE may skip monitoring the first monitoring occasion 310 of the first search space set and the first monitoring occasion 315 of the second search space set according to the overlap rule.

Figure 4:
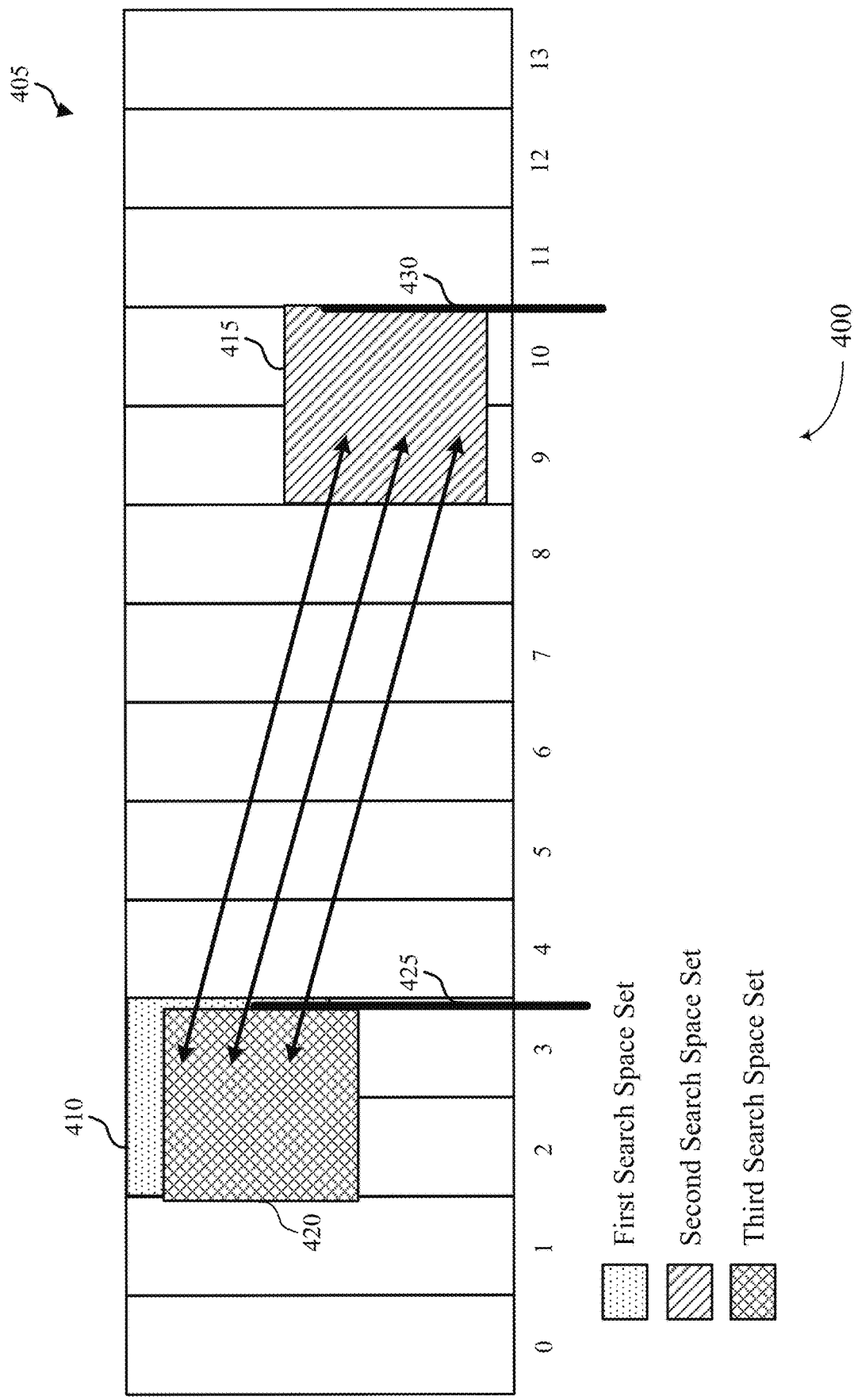

FIG. 4 illustrates an example of a block diagram 400 that supports resolving ambiguities for search space set linking for physical downlink control channel repetition in accordance with aspects of the present disclosure. The block diagram 400 may implement various aspects of the wireless communications system 100 or may be implemented by various aspects of the wireless communications system 100, among other examples. The block diagram 400 shows a slot 405 of 14 symbols.

The slot 405 may be scheduled to have a first monitoring occasion 410 of a first search space set, a second monitoring occasion 415 of a second search space set, and a third monitoring occasion 420 of a third search space set. In the example of FIG. 4, the first monitoring occasion 410 and the third monitoring occasion 420 overlap. The first search space set and the second search space set may be linked for PDCCH repetition.

If there is a third search space set that has the same monitoring occasion (at least in one instance) as the first search space set, is associated with the same CORESET as the first search space set, and is configured with a DCI format with the same size as the configured DCI format in the first search space set, then the UE may have the following ambiguity: If the UE decodes a PDCCH candidate using the set of CCEs in an overlapping monitoring occasion 410 of the first search space set and the monitoring occasion 420 of the third search space set, if the UE assumes that the decoded DCI belongs to the first search space set, the UE may consider this as PDCCH repetition. Thus, the UE may use the slot, symbol, or resources of a later PDCCH candidate among the two linked PDCCH candidates as reference, which can happen to be in the second search space set in order to determine scheduling information. As shown in FIG. 4, the later symbol 430 of the second search space set may be used by the UE to determine the scheduling information. Alternatively, if the UE assumes that the decoded DCI belongs to the third search space set, then the UE may consider there to be no PDCCH repetition (because the third search space set is not linked with any other search space set), and hence, the UE may interpret the DCI to determine the scheduling information as if there were no PDCCH repetition.

This situation may arise for certain DCIs which need more frequent monitoring, and therefore have different periodicities than other DCIs, which may cause an overlapping monitoring occasion. For example, the periodicity of the first search space set could be 1 slot. Another, third search space set may have DCIs with less frequent monitoring, and has a periodicity of 10 slots. In this example, nine out of ten times there is no ambiguity in the slots because there is no overlapping monitoring occasion in those slots. However, in 1 out of 10 every slots, there may be an overlap between the monitoring occasions. The UE may only perform one decoding, and a second decoding would not be counted as a blind decoding. In examples without PDCCH repetition, this does not raise any problems, but it does cause ambiguity with PDCCH repetition.

In this example, the UE may determine that the first search space set and the second search space set are linked for PDCCH repetition. In some situations, a third search space set may be used that has a same monitoring occasion 420 as the monitoring occasion 410 in at least one instance. There can be ambiguities if the first search space set and the third search space set are associated with the same CORESET, and if the third search space set is configured with a DCI format with the same size as the configured DCI format in the first search space set (i.e., the first search space set and the third search space set have the same CORESET and same DCI size). If the UE decodes a PDCCH candidate using the set of CCEs in the overlapping monitoring occasion, then the UE may not know which search space set the DCI belongs to. There may be no way for the UE to distinguish between the first search space set and the third search space set, because they have the same CORESET, same DCI size, and the same scrambling.

The UE may decide to interpret the DCI as belonging to one or the other of the first search space set or the third search space set. If the UE assumes that the decoded DCI belongs to the first search space set, then the UE considers this as PDCCH repetition because the first search space set is linked with the second search space set. When the UE considers itself to be using PDCCH repetition, the UE may apply the overlap rule that regards the slot, start symbol, or resources of a later PDCCH candidate which is being linked with the first PDCCH candidate in the first search space set as the reference. For example, the symbol 430 of the second search space set may be used as the reference.

Alternatively, the UE may assume that the decoded DCI belongs to the third search space set. If the UE assumes that the decoded DCI belongs to the third search space set, the UE may treat this as not having PDCCH repetition because the third search space set is not linked with any other search space set. In this example, the UE may interpret the DCI as without PDCCH to determine the scheduling information. For example, if the last symbol 425 of the PDCCH is used, then the UE uses the last symbol of the DCI.

Techniques described herein resolve the potential ambiguities. For example, the overlap rule may configure or cause the UE to not expect that a third search space set has an overlapping monitoring occasion with a monitoring occasion of a first search space set unless one of the following occurs. First, the first search space set and the third search space set are associated with different CORESETs. In that case, decoding these DCIs are not counted as a single decoding and the UE can distinguish between them. Second, the DCI format monitored in the first search space set has a different size than the DCI format monitored in the third search space set. This may be because if the DCI formats have different sizes, then the UE may perform two different blind decoding events and thus there is no confusion. Third, the third search space set is also linked with a fourth search space set for PDCCH repetition. Here, the overlapped monitoring occasion of the third search space set (the monitoring occasion linked with the first search space set) is linked with a monitoring occasion of the fourth search space set which overlaps with a monitoring occasion of the second search space set that is linked with the monitoring occasion of the first search space set. This creates ambiguity, but if the third search space set is linked with the fourth search space set that also overlaps with the second search space set, then there is no ambiguity because the UE would apply the same rule. Regardless of which DCI of the first or third search space set the UE determines that it is decoding, the UE may apply the same rule.

Alternatively, if the above-described conditions are not satisfied (e.g., the first search space set and the third search space set have the same CORESET, the same DCI size, and the third search space set is not linked with a fourth search space set), then other techniques may be used. For example, the UE may assume that a PDCCH candidate in the third search space set over the same set of CCEs as a PDCCH candidate in the first search space set is also linked with a PDCCH candidate in the second search space set that the first search space set is linked with. In this alternative, the UE may apply the rule corresponding to the PDCCH repetition. For example, even though the third search space set is not linked for PDCCH repetition, the UE may assume that in the monitoring occasion for a PDCCH candidate that has the same CCE as the first search space set, it is also configured with repetition for the second search space set. In that case, the UE may apply the rules corresponding to the PDCCH repetition and avoid the ambiguity.

In another example, the UE may drop the overlapping monitoring occasion of the third search space set and only monitor the monitoring occasion of the first search space set. In this case, the UE may monitor PDCCH repetition, and the corresponding rules are applied because the UE thinks the monitoring occasion of the third search space set is ignored.

Alternatively, the UE may drop the overlapping monitoring occasion of the first search space set and only monitor the monitoring occasion of the third search space set. In this case, the rules for PDCCH repetitions are not applied. The UE may also ignore the linked monitoring occasion of the second search space set because the linked monitoring occasion of the first search space set was dropped.

The choice between dropping the monitoring occasion for the first search space set or the third search space set may depend on the search space set index of the first and third search space sets. For example, the UE may compare the indexes and drop the monitoring occasion associated with either the higher or lower index.

For any of these examples, the dropping action can be at the PDCCH candidate level instead of at the monitoring occasion level. Each monitoring occasion may have multiple PDCCH candidates. Instead of dropping the entire monitoring occasion, only a PDCCH candidate may be dropped. In some examples, more than one PDCCH candidate may be dropped. There may be examples where a PDCCH candidate in the overlapping monitoring occasion of the first search space set does not use any CCEs of the overlapped monitoring occasion of the third search space set. In such an example, dropping may not be needed. That is, even though the monitoring occasions overlap, and the conditions are not satisfied, it is possible that a PDCCH candidate is not actually overlapped at the PDCCH candidate level.

In some examples, the UE may identify a third search space set having a same monitoring occasion as the first search space set. The UE may monitor the identified one or more monitoring occasions for the first search space set, the second search space set, and the third search space set based at least in part on the overlap rule.

In some examples, the overlap rule may cause the UE to monitor the identified one or more monitoring occasions for the first search space set, the second search space set, and the third search space set independently.

In some examples, the UE may determined that the first search space set is associated with a first control resource set and the third search space set is associated with a second control resource set different from the first control resource set, wherein the overlap rule defines or causes the UE to monitor for the DCI in the first search space set and monitor for a second DCI in the third search space set.

In another example, the UE may determine that the first search space set has a downlink control format of a first size and that the third search space set has a downlink control format of a second size different from the first size, wherein the overlap rule defines to monitor for the downlink control information in the first search space set and monitor for a second downlink control information in the third search space set.

In some examples, the UE may identify a link between the third search space set and a fourth search space set for PDCCH repetition. The UE may also identify that a monitoring occasion in the second search space set overlaps with a monitoring occasion in the fourth search space set, wherein the overlap rule defines the UE to monitor for the DCI in the first search space set and monitor for a second DCI in the third search space set.

In some examples, the first search space set and the third search space set have a same CORESET and a same downlink control format size, and the third search space set is not linked with a fourth search space set. In some examples, the UE may link the third search space set with the second search space set, wherein the overlap rule indicates the UE to treat the monitoring occasion of the second search space set as linked with the monitoring occasion of the third search space set. In some examples, the UE may drop a monitoring occasion or a PDCCH candidate of the third search space set, wherein the overlap rule determines or indicates the UE to monitor a monitoring occasion of the first search space set. In other examples, the UE may drop a monitoring occasion or PDCCH candidate of the first search space set, wherein the overlap rule determines to monitor a monitoring occasion of the third search space set.

In some examples, the UE may compare a first index of the first search space set with a second index of the third search space set and drop a monitoring occasion of the first search space set or the third search space set based at least in part on the comparison, wherein the overlap rule determines or indicates the UE to monitor the search space set based at least in part on the comparison. In some examples, the UE may drop a PDCCH candidate of a monitoring occasion of the first search space set or a monitoring occasion of the third search space set, wherein the overlap rule determines or indicates the UE to monitor the PDCCH candidate of the retained monitoring occasion of the first search space set or the third search space set. In some examples, the UE may drop a physical downlink control channel candidate of a monitoring occasion of a search space set.

Another potential source of ambiguity may arise with two linked PDCCH candidates for PDCCH repetition. Typically, the UE may try blind decoding the first PDCCH candidate, the second PDCCH candidate, and the combined PDCCH candidate (by soft combining both). If the UE decodes a DCI in the first linked PDCCH candidate, the UE may skip decoding the second PDCCH candidate or the combined PDCCH candidate. This could result in power saving or complexity reduction.

The UE may only skip decoding DCI if the UE can assume that different DCIs are not expected to be present in the two linked PDCCH candidates. If the UE cannot assume this, even though the UE decodes the first candidate, the UE may need to continue to monitor and try to decode the second PDCCH candidate, because the second PDCCH candidate might not be a repetition of the first DCI. In that situation, the UE could not benefit from the power savings of skipping monitoring for and decoding the second DCI.

When a first PDCCH candidate in a first search space set is linked with a second PDCCH candidate in a second search space set for PDCCH repetition, the UE may not expect to decode different DCIs using the CCEs of the two linked PDCCH candidates. Different DCIs may be defined if one or more of the following conditions applies: the DCIs have different DCI payloads including different DCI sizes, the DCIs have different formats, or the DCIs have different radio network temporary identifiers.

Whether the UE can expect the above in the case of PDCCH repetition or not can be a rule or constraint within the network or can be enabled by RRC configuration. For example, if the RRC parameter is configured, the UE may expect this constraint. The network may configure this behavior in the case that the network wants to improve power saving. Not enabling this behavior may result in more flexibility at the network but less power savings. In cases where the network uses two PDCCH candidates to convey two different DCIs, the RRC parameter may not be configured.

In some examples, the UE may receive a configuration of an RRC parameter, wherein the overlap rule is based at least in part on the RRC parameter. In some examples, the UE may determine that there are no other search space set linked with the first search space set or the second search space set. In some examples, the overlap rule may indicate that there is no overlap between the first search space set or the second search space set.

In some examples, the UE may determine that the first PDCCH candidate and the second PDCCH candidate have a same DCI payload, a same downlink control format size, and a same radio network temporary identifier. In this example, monitoring the identified one or more monitoring occasions may further include monitoring a first PDCCH candidate in the first search space set and a second PDCCH candidate in the second search space set based at least in part on the determining.

Figure 5:
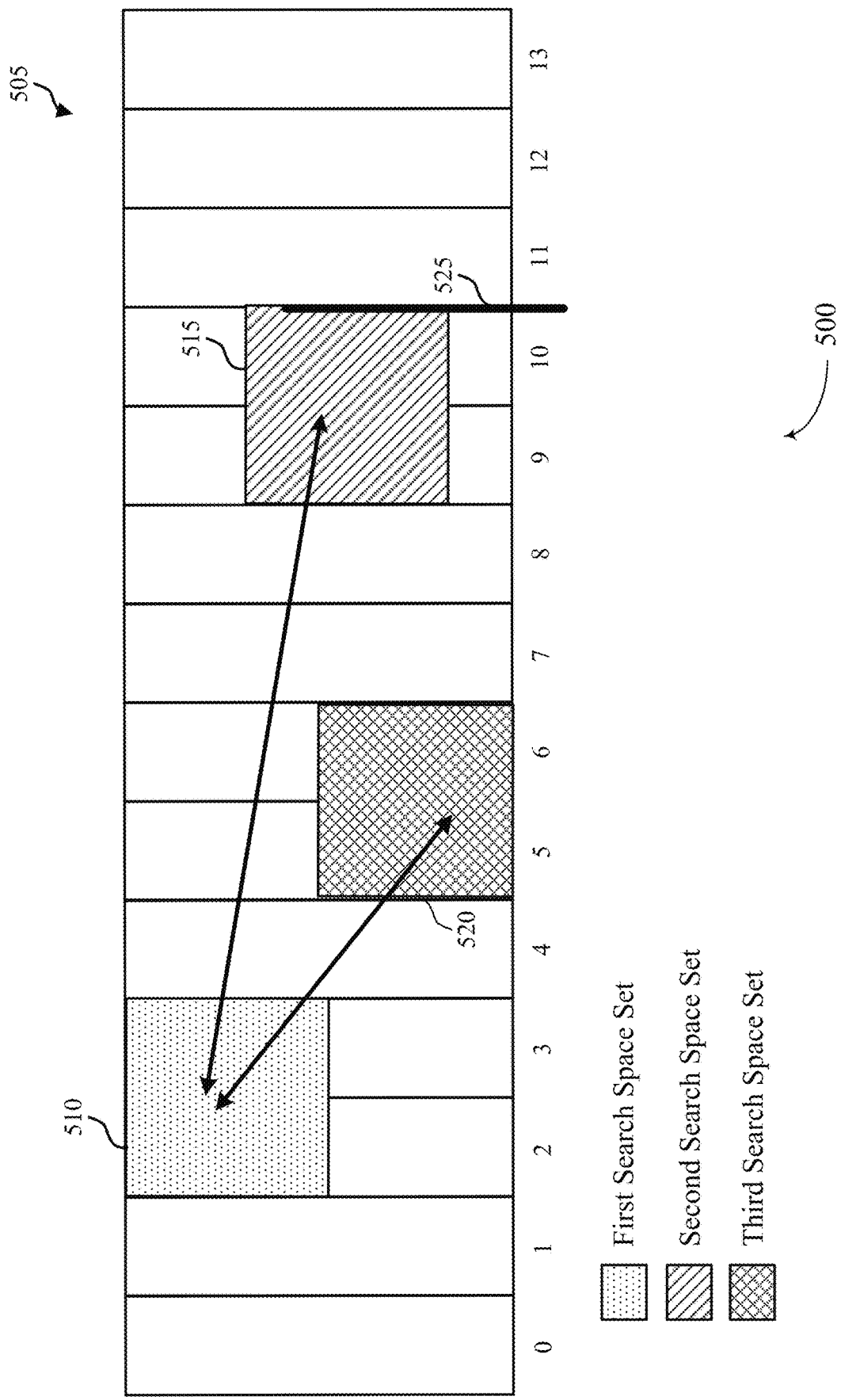

FIG. 5 illustrates an example of a block diagram 500 that supports resolving ambiguities for search space set linking for physical downlink control channel repetition in accordance with aspects of the present disclosure. The block diagram 500 may implement various aspects of the wireless communications system 100 or may be implemented by various aspects of the wireless communications system 100, among other examples. The block diagram 500 shows a slot 505 of 14 symbols.

If a first search space set and a second search space set are linked for PDCCH repetition, there may be an ambiguity around whether the first search space set can also be linked with another, third search space set for PDCCH repetition. Techniques are described herein that enable the UE to know if the detected DCI corresponds to the PDCCH repetition with the second search space set or the third search space set. If the overlap rule is based at least in part on the last symbol of the last repetition, that reference would be either in the second or third search space set.

In one example, when a first search space set is linked with a second search space set for PDCCH repetition, the UE may not expect either of the search space sets to be linked with any other search space set for PDCCH repetition. If there is such a configuration, the UE detects an error case.

In another example, when a first search space set is linked with a second search space set for PDCCH repetition, a detected DCI in any one or more search space set (irrespective of which one) may be interpreted based at least in part on a rule that considers all three search space set. For example, the techniques describe that for a rule that uses the last symbol of the later linked PDCCH candidate as a reference, the last symbol among the three search space sets may be considered as the reference. In another example, for a rule that considers the search space set with higher index among the linked search space sets, the rule may be extended such that the search space set with higher or lower index among the search space sets may be considered as the reference.

This technique may be conditioned on the UE detecting a DCI in a PDCCH candidate in the first search space set (i.e., the search space set that is used in both linked pairs of monitoring occasions) or in any combined PDCCH candidate that includes a PDCCH candidate in the first search space set. This means that this rule could be followed when a DCI is detected in the first search space set or when a DCI is detected after soft combining. In other words, if the DCI is detected only in the second search space set, and not using the first search space set, then there is no ambiguity and the rule is not applied.

In the example of FIG. 5, a monitoring occasion 510 of a first search space set is linked with a monitoring occasion 515 of a second search space set and a monitoring occasion 520 of a third search space set. In terms of the time domain resources, the first monitoring occasion in time is the monitoring occasion 510 of the first search space set, then the monitoring occasion 520 of the third search space set is second in time, then the monitoring occasion 515 of the second search space set is last in time. The overlap rule may be based at least in part on a symbol 525 of the search space set that is last in time. The symbol 525 may be applied to the third search space set even though the third search space set and the second search space set are not directly linked.

In some examples, the UE may determine that there is no other search space set linked with the first search space set or the second search space set. In some examples, the overlap rule indicates that there is no overlap between the first search space set or the second search space set. In other examples, the UE may determine that a third search space set is linked with the first search space set, detect the DCI in the one or more monitoring occasions, and determine scheduling information according to the overlap rule. In some examples, the overlap rule may be based at least in part on a last symbol of a PDCCH candidate for the search space set of the first, second, or third search space sets that occurs last in time or has a higher index. In other examples, the overlap rule may be further based at least in part on the DCI being associated with the first search space set.

Figure 6:
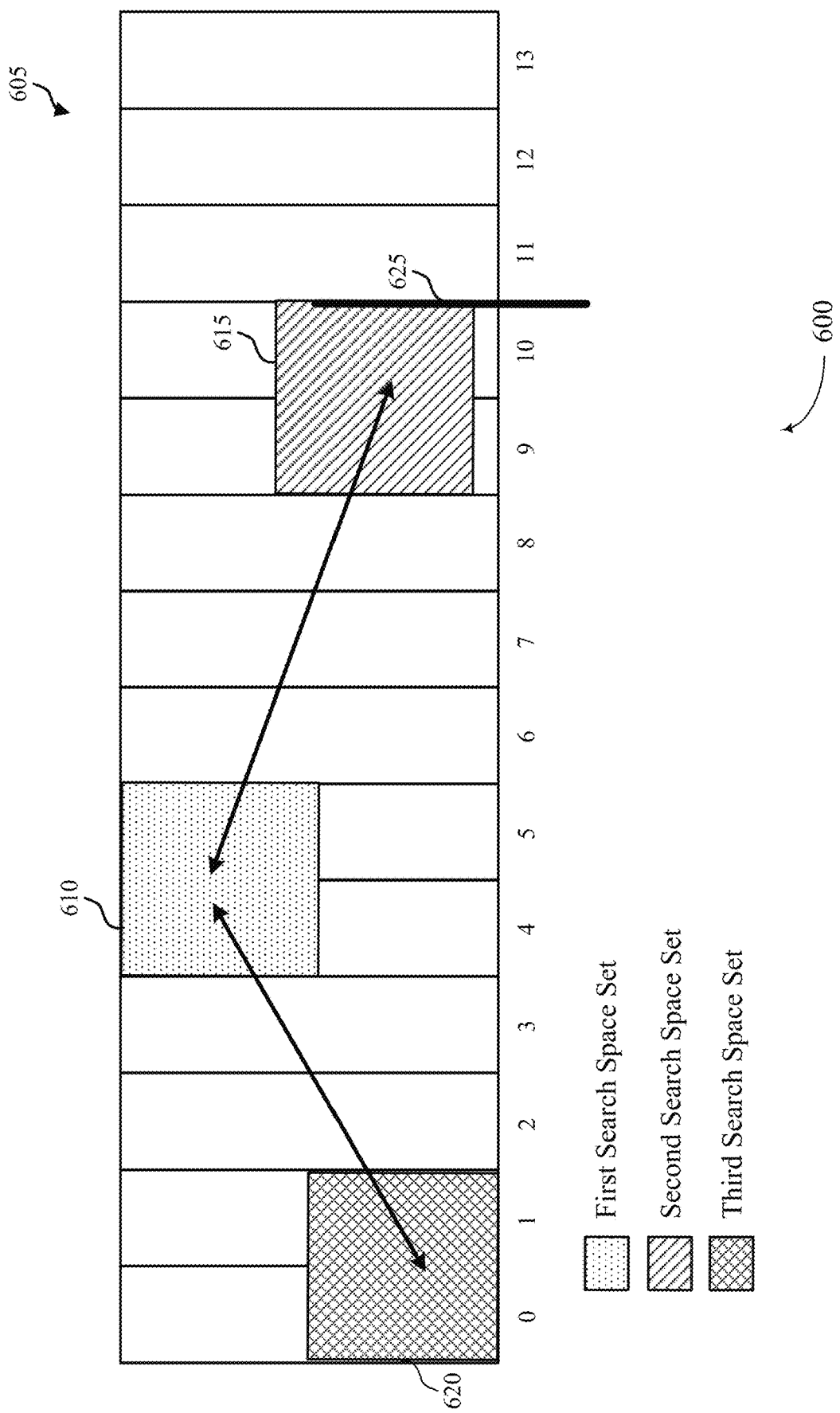

FIG. 6 illustrates an example of a block diagram 600 that supports resolving ambiguities for search space set linking for PDCCH repetition in accordance with aspects of the present disclosure. The block diagram 600 may implement various aspects of the wireless communications system 100 or may be implemented by various aspects of the wireless communications system 100, among other examples. The block diagram 600 shows a slot 605 of 14 symbols.

Like in the example of FIG. 5, FIG. 6 includes a monitoring occasion 610 of a first search space set is linked with a monitoring occasion 615 of a second search space set and a monitoring occasion 620 of a third search space set. In terms of the time domain resources, the first monitoring occasion in time is the monitoring occasion 620 of the third search space set, then the monitoring occasion 610 of the first search space set, then the monitoring occasion 615 of the second search space set. In this example, the overlap rule may be based at least in part on a symbol 625 of the last search space set in time. The symbol 625 may be applied to the third search space set even though the third search space set and the second search space set are not directly linked.

Figure 7:
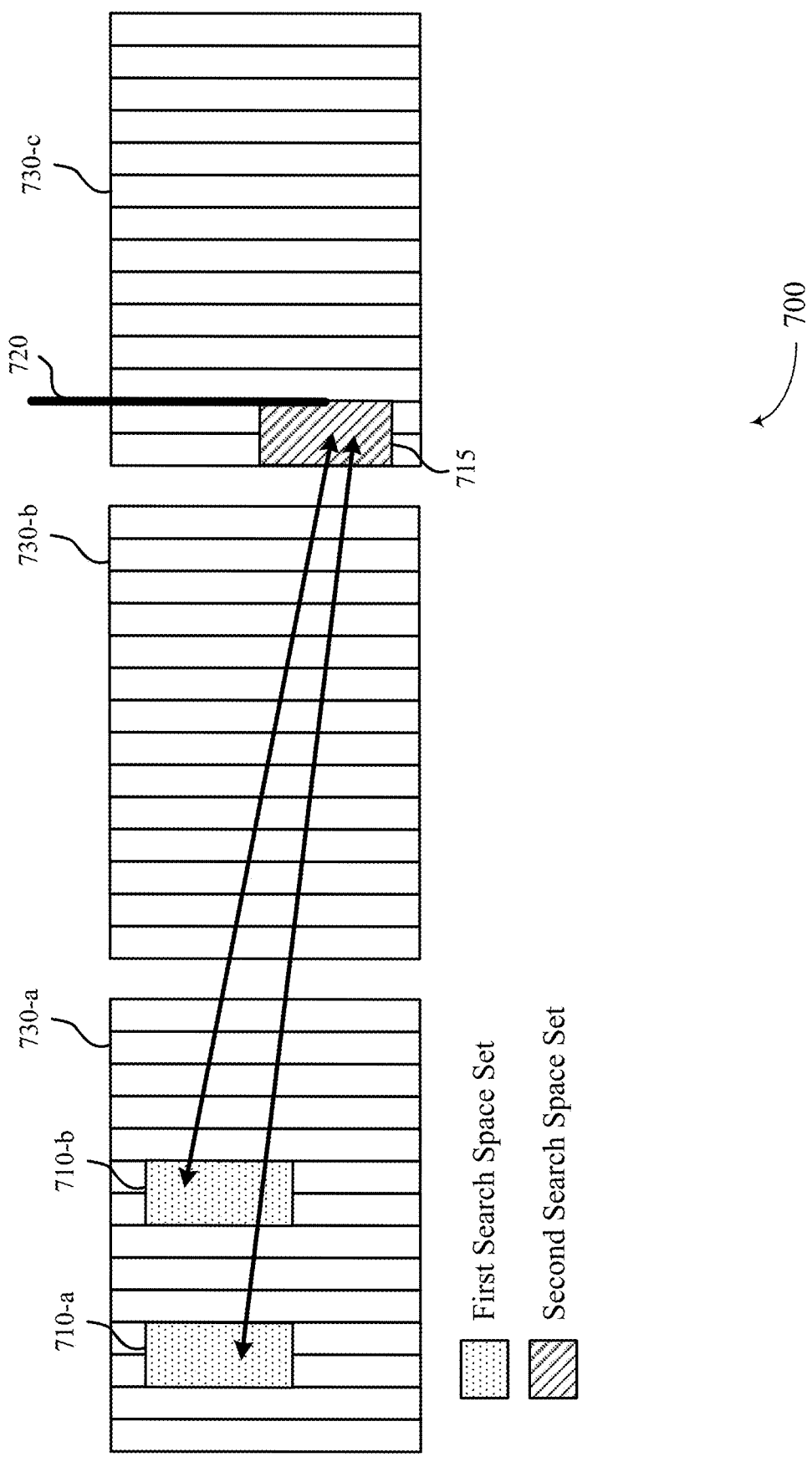

FIG. 7 illustrates an example of a block diagram 700 that supports resolving ambiguities for search space set linking for physical downlink control channel repetition in accordance with aspects of the present disclosure. The block diagram 700 may implement various aspects of the wireless communications system 100 or may be implemented by various aspects of the wireless communications system 100, among other examples. The block diagram 700 shows three slots 730-a, 730-b, and 730-c of 14 symbols each.

Another ambiguity may arise when a first monitoring occasion of a first search space set is linked with a monitoring occasion of a second search space set for PDCCH repetition regarding whether a second monitoring occasion of the first search space set can be linked with the monitoring occasion of the second search space set. This is similar to the ambiguity discussed with respect to FIGS. 5 and 6, but in the monitoring occasion domain instead of the search space set domain.

In FIG. 7, the first search space set has a first monitoring occasion 710-a in a first slot 730-a and a second monitoring occasion 710-b in the same slot, first slot 730-a. The second search space set has a monitoring occasion 715 in a third slot 730-*c*, with a second slot 730-*b* between the first slot 730-*a* and the third slot 730-*c*.

In one example, when the first monitoring occasion 710-*a* of the first search space set is linked with the monitoring occasion 715 of the second search space set for PDCCH repetition, the UE may not expect the second monitoring occasion 710-*b* to be linked with the monitoring occasion 715 of the second search space set. The UE may determine this to be an error case.

In another example, when the first monitoring occasion 710-*a* of the first search space set is linked with a monitoring occasion 715 of the second search space set for PDCCH repetition, a detected DCI in any one or more of the monitoring occasions (irrespective of which one) is interpreted based at least in part on a rule that considers all three monitoring occasions. For example, the overlap rule may use the last symbol 720 of the later linked PDCCH candidate as a reference, the last symbol 720 being among the three monitoring occasions considered. In some examples, the overlap rule may be conditioned on if the UE detects a DCI in a PDCCH candidate in the monitoring occasion 715 of the second search space set (the one that is used for both links) or in any combined PDCCH candidate that includes a PDCCH candidate in the monitoring occasion 715 of the second search space set.

In some examples, the overlap rule may skip or drop monitoring the second monitoring occasion 710-*b* of the first search space set that is linked with the monitoring occasion 715 of the second search space set. In other examples, the UE may determine that the first monitoring occasion 710-*a* and the second monitoring occasion 710-*b* of the first search space set are linked with the monitoring occasion 715 of the second search space set and detect the DCI in the one or more monitoring occasions. In another example, the UE may determine scheduling information according to the overlap rule, wherein the overlap rule is based at least in part on a last symbol of a PDCCH candidate occurring in the last monitoring occasion among the first monitoring occasion 710-*a* of the first search space set, the monitoring occasion 715 of the second search space set, or the second monitoring occasion 710-*b* of the first search space set. In some examples, the overlap rule may be further based at least in part on the detecting the DCI in the monitoring occasion 715 of the second search space set.

Figure 8:
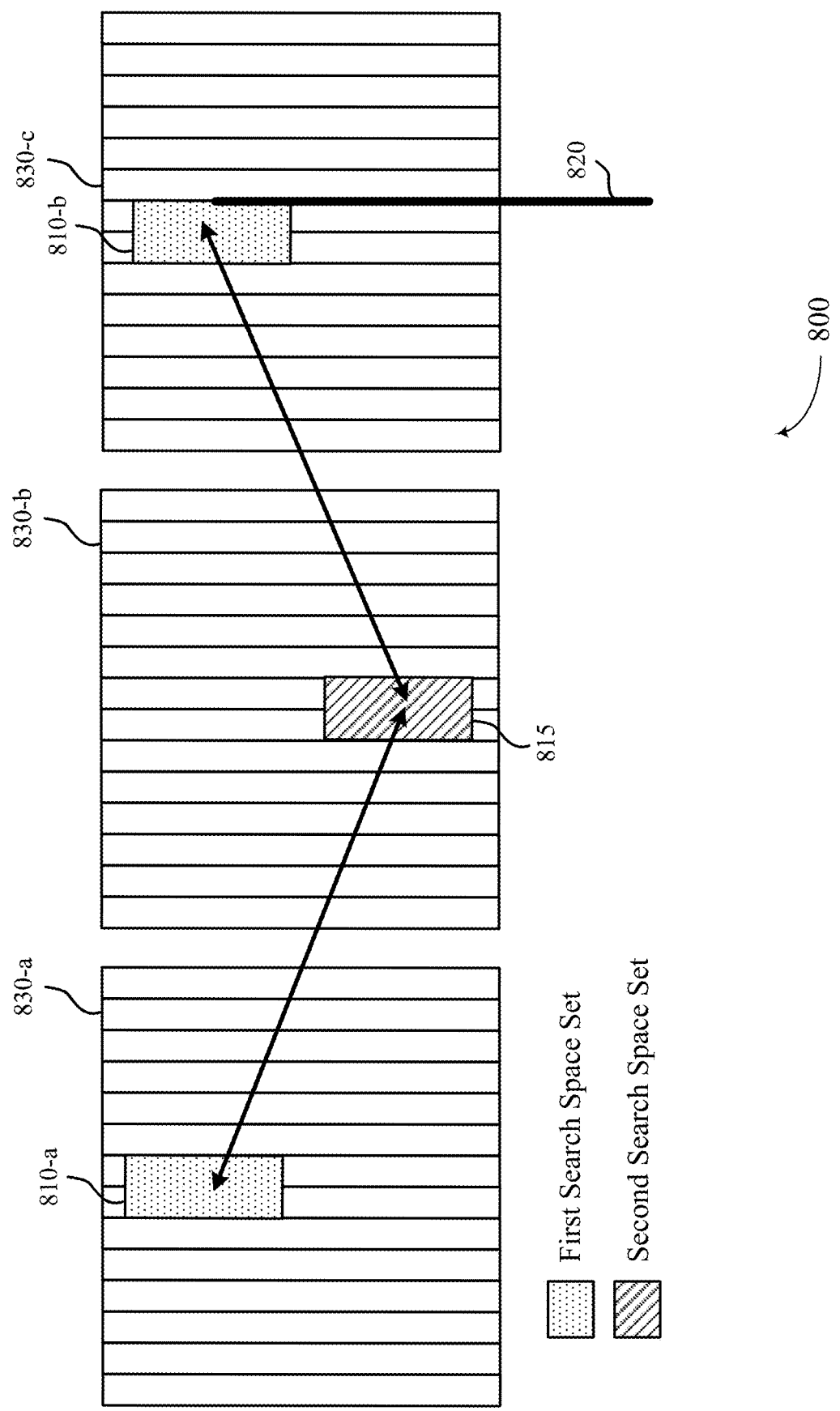

FIG. 8 illustrates an example of a block diagram 800 that supports resolving ambiguities for search space set linking for physical downlink control channel repetition in accordance with aspects of the present disclosure. The block diagram 800 may implement various aspects of the wireless communications system 100 or may be implemented by various aspects of the wireless communications system 100, among other examples. The block diagram 800 shows three slots 830-*a*, 830-*b*, and 830-*c* of 14 symbols each.

In FIG. 8, the first search space set has a first monitoring occasion 810-*a* in the first slot 830-*a* and a second monitoring occasion 810-*b* in a third slot 830-*c*. The second search space set has a monitoring occasion 815 in the second slot 730-*b*. Like the example of FIG. 7, FIG. 8 includes a first monitoring occasion 810-*a* of a first search space set linked with a monitoring occasion 815 of a second search space set and a second monitoring occasion 810-*b* that is also linked with the monitoring occasion 815. In terms of the time domain resources, the first monitoring occasion is the first monitoring occasion 810-*a* of the first search space set, then the monitoring occasion 815 of the second search space set, then the second monitoring occasion 810-*b* of the first search space set. Then the overlap rule may be based at least in part on a symbol 820 of the last monitoring occasion in time.

Figure 9:
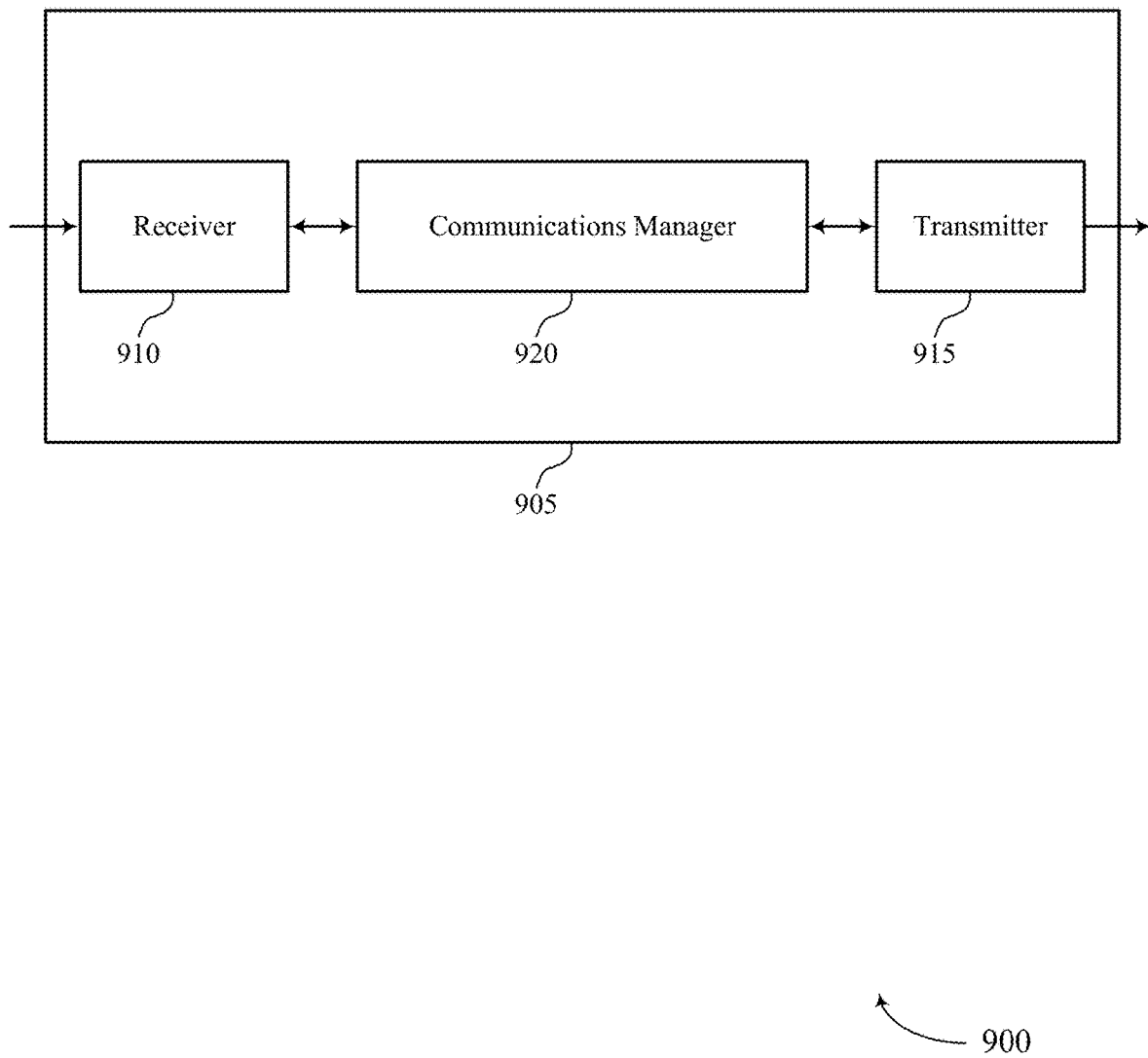
FIGS. 9 and 10 show block diagrams of devices that support resolving ambiguities for search space set linking for physical downlink control channel repetition in accordance with aspects of the present disclosure.

FIG. 9 shows a block diagram 900 of a device 905 that supports resolving ambiguities for search space set linking for physical downlink control channel repetition in accordance with aspects of the present disclosure. The device 905 may be an example of aspects of a UE 115 as described herein. The device 905 may include a receiver 910, a transmitter 915, and a communications manager 920. The device 905 may also include a processor. Each of these components may be in communication with one another (e.g., via one or more buses). The communications manager 920 may be an example of the communications manager 160 of FIG. 1.

The receiver 910 may provide a means for receiving information such as packets, user data, control information, or any combination thereof associated with various information channels (e.g., control channels, data channels, information channels related to resolving ambiguities for search space set linking for physical downlink control channel repetition). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to resolving ambiguities for search space set linking for physical downlink control channel repetition). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of resolving ambiguities for search space set linking for physical downlink control channel repetition as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 920 may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communication at a UE in accordance with examples as disclosed herein. For example, the communications manager 920 may be configured as or otherwise support a means for receiving a configuration of a first search space set and a second search space set. The communications manager 920 may be configured as or otherwise support a means for identifying a link between the first search space set and the second search space set for physical downlink control channel repetition. The communications manager 920 may be configured as or otherwise support a means for identifying one or more monitoring occasions in the first search space set or the second search space set to monitor for DCI based at least in part on an overlap rule associated with the link between the first search space set and the second search space set for PDCCH repetition. The communications manager 920 may be configured as or otherwise support a means for monitoring the identified one or more monitoring occasions in at least the first search space set or the second search space set for the downlink control information.

By including or configuring the communications manager 920 in accordance with examples as described herein, the device 905 (e.g., a processor controlling or otherwise coupled to the receiver 910, the transmitter 915, the communications manager 920, or a combination thereof) may support techniques for resolving ambiguity, reducing power usage, and reducing complexity.

Figure 10:
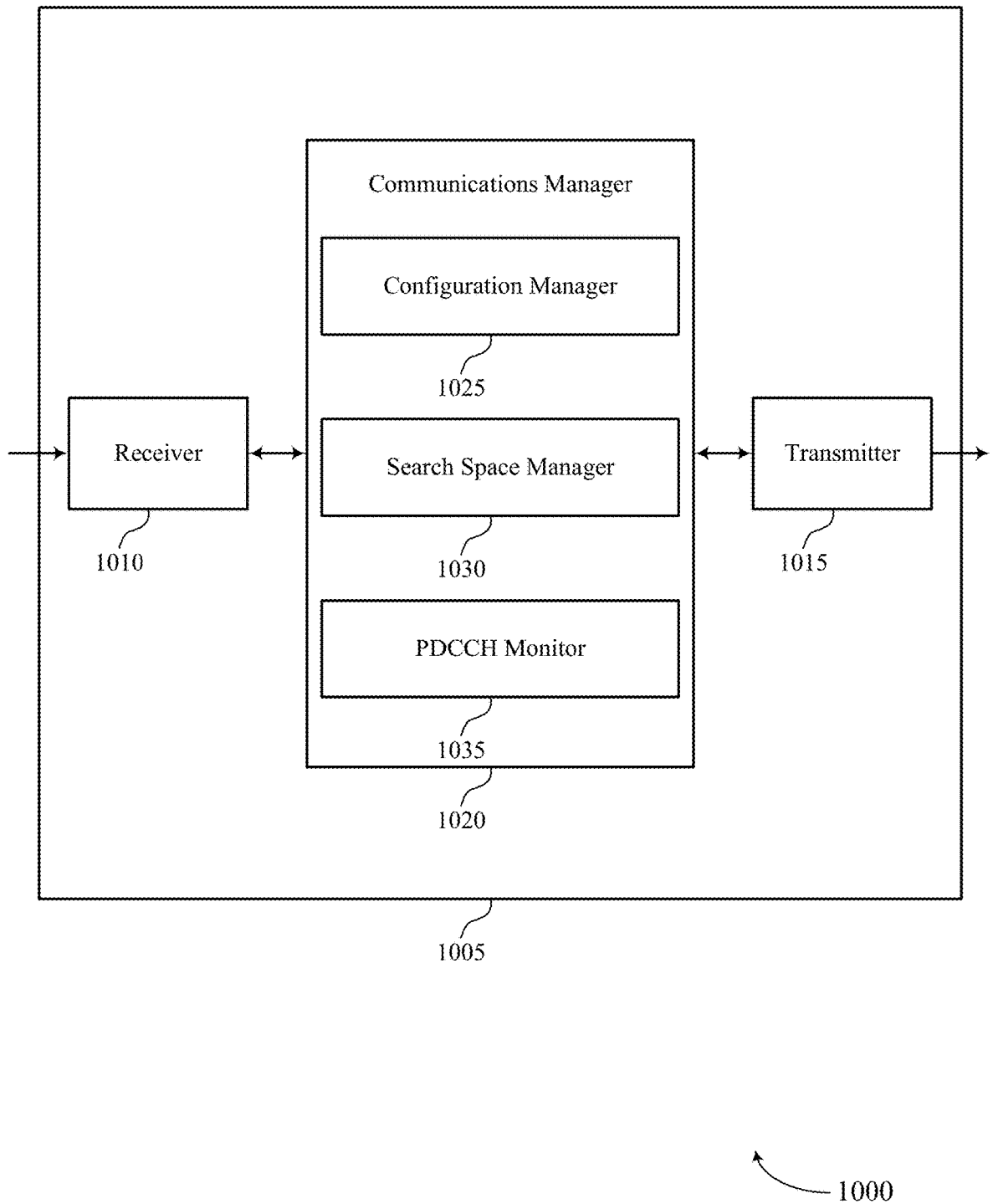

FIG. 10 shows a block diagram 1000 of a device 1005 that supports resolving ambiguities for search space set linking for physical downlink control channel repetition in accordance with aspects of the present disclosure. The device 1005 may be an example of aspects of a device 905 or a UE 115 as described herein. The device 1005 may include a receiver 1010, a transmitter 1015, and a communications manager 1020. The device 1005 may also include a processor. Each of these components may be in communication with one another (e.g., via one or more buses). The communications manager 1020 may be an example of the communications manager 160 of FIG. 1 or the communications manager 920 of FIG. 9.

The receiver 1010 may provide a means for receiving information such as packets, user data, control information, or any combination thereof associated with various information channels (e.g., control channels, data channels, information channels related to resolving ambiguities for search space set linking for physical downlink control channel repetition). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to resolving ambiguities for search space set linking for physical downlink control channel repetition). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of resolving ambiguities for search space set linking for physical downlink control channel repetition as described herein. For example, the communications manager 1020 may include a configuration manager 1025, a search space manager 1030, a PDCCH monitor 1035, or any combination thereof. The communications manager 1020 may be an example of aspects of a communications manager 920 as described herein. In some examples, the communications manager 1020, or various components thereof, may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communication at a UE in accordance with examples as disclosed herein. The configuration manager 1025 may be configured as or otherwise support a means for receiving a configuration of a first search space set and a second search space set. The search space manager 1030 may be configured as or otherwise support a means for identifying a link between the first search space set and the second search space set for physical downlink control channel repetition. The search space manager 1030 may be configured as or otherwise support a means for identifying one or more monitoring occasions in the first search space set or the second search space set to monitor for DCI based at least in part on an overlap rule associated with the link between the first search space set and the second search space set for PDCCH repetition. The PDCCH monitor 1035 may be configured as or otherwise support a means for monitoring the identified one or more monitoring occasions in at least the first search space set or the second search space set for the DCI.

Figure 11:
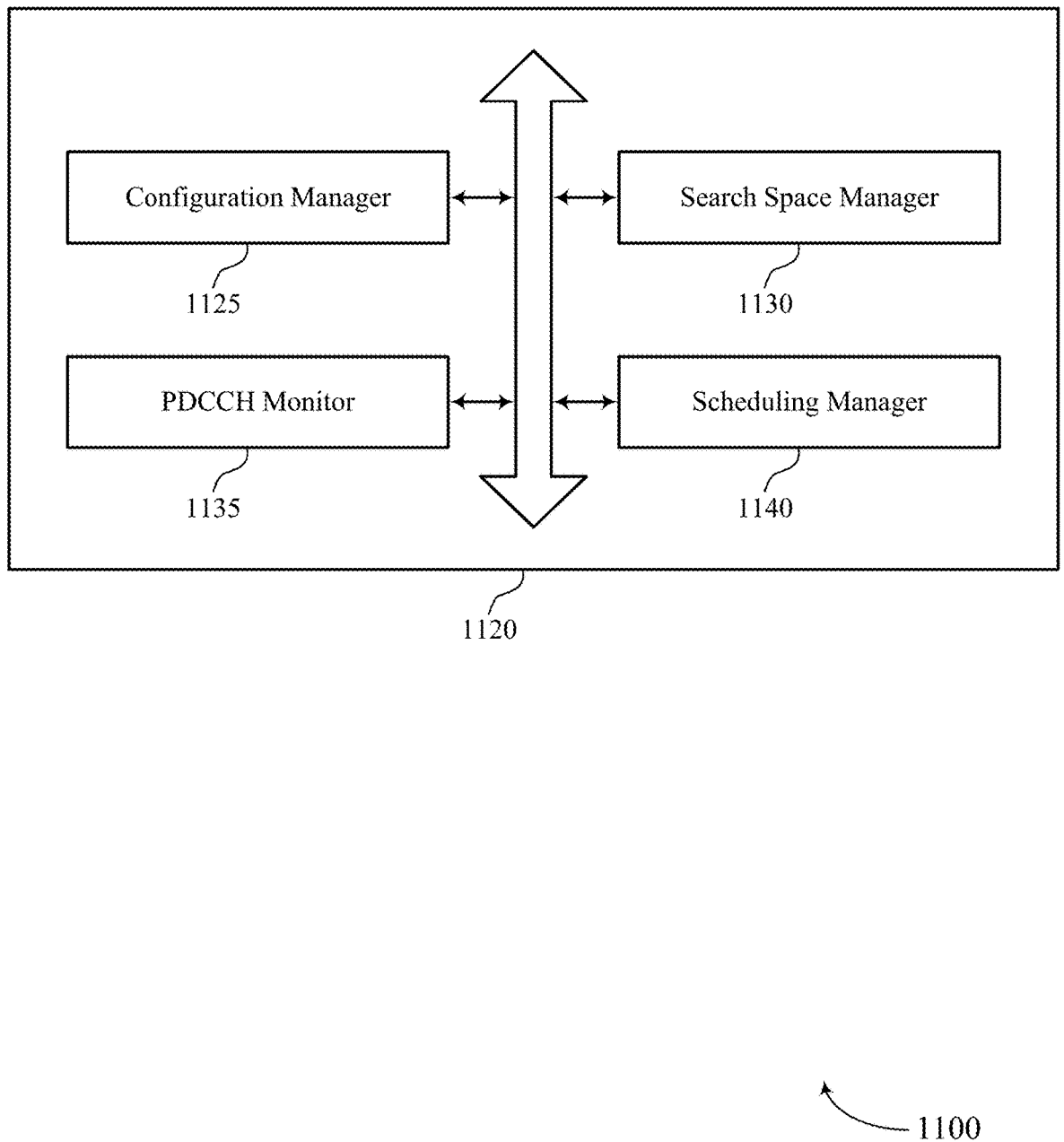
FIG. 11 shows a block diagram of a communications manager that supports resolving ambiguities for search space set linking for physical downlink control channel repetition in accordance with aspects of the present disclosure.

FIG. 11 shows a block diagram 1100 of a communications manager 1120 that supports resolving ambiguities for search space set linking for physical downlink control channel repetition in accordance with aspects of the present disclosure. The communications manager 1120 may be an example of aspects of a communications manager 920, a communications manager 1020, a communications manager 160, or any combination, as described herein. The communications manager 1120, or various components thereof, may be an example of means for performing various aspects of resolving ambiguities for search space set linking for physical downlink control channel repetition as described herein. For example, the communications manager 1120 may include a configuration manager 1125, a search space manager 1130, a PDCCH monitor 1135, a scheduling manager 1140, or any combination thereof. Each of these components may communicate, directly or indirectly, with one another (e.g., via one or more buses).

The communications manager 1120 may support wireless communication at a UE in accordance with examples as disclosed herein. The configuration manager 1125 may be configured as or otherwise support a means for receiving a configuration of a first search space set and a second search space set. The search space manager 1130 may be configured as or otherwise support a means for identifying a link between the first search space set and the second search space set for physical downlink control channel repetition. In some examples, the search space manager 1130 may be configured as or otherwise support a means for identifying one or more monitoring occasions in the first search space set or the second search space set to monitor for DCI based at least in part on an overlap rule associated with the link between the first search space set and the second search space set for PDCCH repetition. The PDCCH monitor 1135 may be configured as or otherwise support a means for monitoring the identified one or more monitoring occasions in at least the first search space set or the second search space set for the DCI.

In some examples, the search space manager 1130 may be configured as or otherwise support a means for determining that no monitoring occasion of the first search space set overlaps with a monitoring occasion of the second search space set based at least in part on the overlap rule. In some examples, the search space manager 1130 may be configured as or otherwise support a means for determining that the first search space set and the second search space set are associated with a CORESET.

In some examples, the search space manager 1130 may be configured as or otherwise support a means for determining that a monitoring occasion of the first search space set overlaps with a monitoring occasion of the second search space set. In some examples, the PDCCH monitor 1135 may be configured as or otherwise support a means for monitoring for the DCI in the first search space set, where the overlap rule indicates to treat the monitoring occasion of the second search space set as unlinked with the monitoring occasion of the first search space set.

In some examples, the search space manager 1130 may be configured as or otherwise support a means for determining that a monitoring occasion of the first search space set overlaps with a monitoring occasion of the second search space set, where the overlap rule determines to ignore the overlapping monitoring occasions. In some examples, monitoring the DCI in at least the first search space set or the second search space set further includes skipping monitoring the monitoring occasion of the first search space set and the monitoring occasion of the second search space set according to the overlap rule.

In some examples, the search space manager 1130 may be configured as or otherwise support a means for identifying a third search space set having a same monitoring occasion as the first search space set. In some examples, the PDCCH monitor 1135 may be configured as or otherwise support a means for monitoring the identified one or more monitoring occasions for the first search space set, the second search space set, and the third search space set based at least in part on the overlap rule. In some examples, the overlap rule defines to monitor the identified one or more monitoring occasions for first search space set, the second search space set, and the third search space set independently.

In some examples, the search space manager 1130 may be configured as or otherwise support a means for determining that the first search space set is associated with a first control resource set and the third search space set is associated with a second control resource set different from the first control resource set, where the overlap rule defines to monitor for the DCI in the first search space set and monitor for a second DCI in the third search space set.

In some examples, the search space manager 1130 may be configured as or otherwise support a means for determining that the first search space set has a downlink control format of a first size and that the third search space set has a downlink control format of a second size different from the first size, where the overlap rule defines to monitor for the DCI in the first search space set and monitor for a second DCI in the third search space set.

In some examples, the search space manager 1130 may be configured as or otherwise support a means for identifying a link between the third search space set and a fourth search space set for PDCCH repetition. In some examples, the search space manager 1130 may be configured as or otherwise support a means for identifying that a monitoring occasion in the second search space set overlaps with a monitoring occasion in the fourth search space set, where the overlap rule defines to monitor for the DCI in the first search space set and monitor for a second DCI in the third search space set.

In some examples, the first search space set and the third search space set have a same CORESET and a same downlink control format size. In some examples, the third search space set is not linked with a fourth search space set.

In some examples, the search space manager 1130 may be configured as or otherwise support a means for linking the third search space set with the second search space set, where the overlap rule indicates to treat the monitoring occasion of the second search space set as linked with the monitoring occasion of the third search space set.

In some examples, the PDCCH monitor 1135 may be configured as or otherwise support a means for dropping a monitoring occasion of the third search space set, where the overlap rule determines to monitor a monitoring occasion of the first search space set. In some examples, the PDCCH monitor 1135 may be configured as or otherwise support a means for dropping a monitoring occasion of the first search space set, where the overlap rule determines to monitor a monitoring occasion of the third search space set.

In some examples, the search space manager 1130 may be configured as or otherwise support a means for comparing a first index of the first search space set with a second index of the third search space set. In some examples, the PDCCH monitor 1135 may be configured as or otherwise support a means for dropping a monitoring occasion of the first search space set or the third search space set based at least in part on the comparison, where the overlap rule determines to monitor the search space set based at least in part on the comparison.

In some examples, the PDCCH monitor 1135 may be configured as or otherwise support a means for dropping a PDCCH candidate of a monitoring occasion of the first search space set or of a monitoring occasion of the third search space set, where the overlap rule determines to monitor the PDCCH candidate of the monitoring occasion of the first search space set or the monitoring occasion of the third search space set that is retained.

In some examples, the search space manager 1130 may be configured as or otherwise support a means for determining that the first PDCCH candidate and the second PDCCH candidate have a same DCI payload, a same downlink control format size, and a same radio network temporary identifier. In some examples, the PDCCH monitor 1135 may be configured as or otherwise support a means for where monitoring the identified one or more monitoring occasions further includes monitoring a first PDCCH candidate in the first search space set and a second PDCCH candidate in the second search space set based at least in part on the determining.

In some examples, the configuration manager 1125 may be configured as or otherwise support a means for receiving a configuration of an RRC parameter, where the overlap rule is based at least in part on the RRC parameter. In some examples, the search space manager 1130 may be configured as or otherwise support a means for determining that there is no other search space set linked with the first search space set or the second search space set.

In some examples, the search space manager 1130 may be configured as or otherwise support a means for determining that a third search space set is linked with the first search space set. In some examples, the PDCCH monitor 1135 may be configured as or otherwise support a means for detecting the DCI in the one or more monitoring occasions. In some examples, the scheduling manager 1140 may be configured as or otherwise support a means for determining scheduling information according to the overlap rule.

In some examples, the overlap rule is based at least in part on a last symbol of a PDCCH candidate for the search space set of the first, second, or third search space sets that occurs last in time or has a higher index. In some examples, the overlap rule is further based at least in part on the DCI being associated with the first search space set. In some examples, the overlap rule skips monitoring a second monitoring occasion of the first search space set that is linked with a monitoring occasion of the second search space set.

In some examples, the search space manager 1130 may be configured as or otherwise support a means for determining that a first monitoring occasion and a second monitoring occasion of the first search space set are linked with a monitoring occasion of the second search space set. In some examples, the PDCCH monitor 1135 may be configured as or otherwise support a means for detecting the DCI in the one or more monitoring occasions. In some examples, the scheduling manager 1140 may be configured as or otherwise support a means for determining scheduling information according to the overlap rule, where the overlap rule is based at least in part on a last symbol of a PDCCH candidate for the first monitoring occasion of the first search space set, the monitoring occasion of the second search space set, or the second monitoring occasion of the first search space set that occurs last in time.

In some examples, the overlap rule is further based at least in part on the detecting the DCI in the monitoring occasion of the second search space set.

Figure 12:
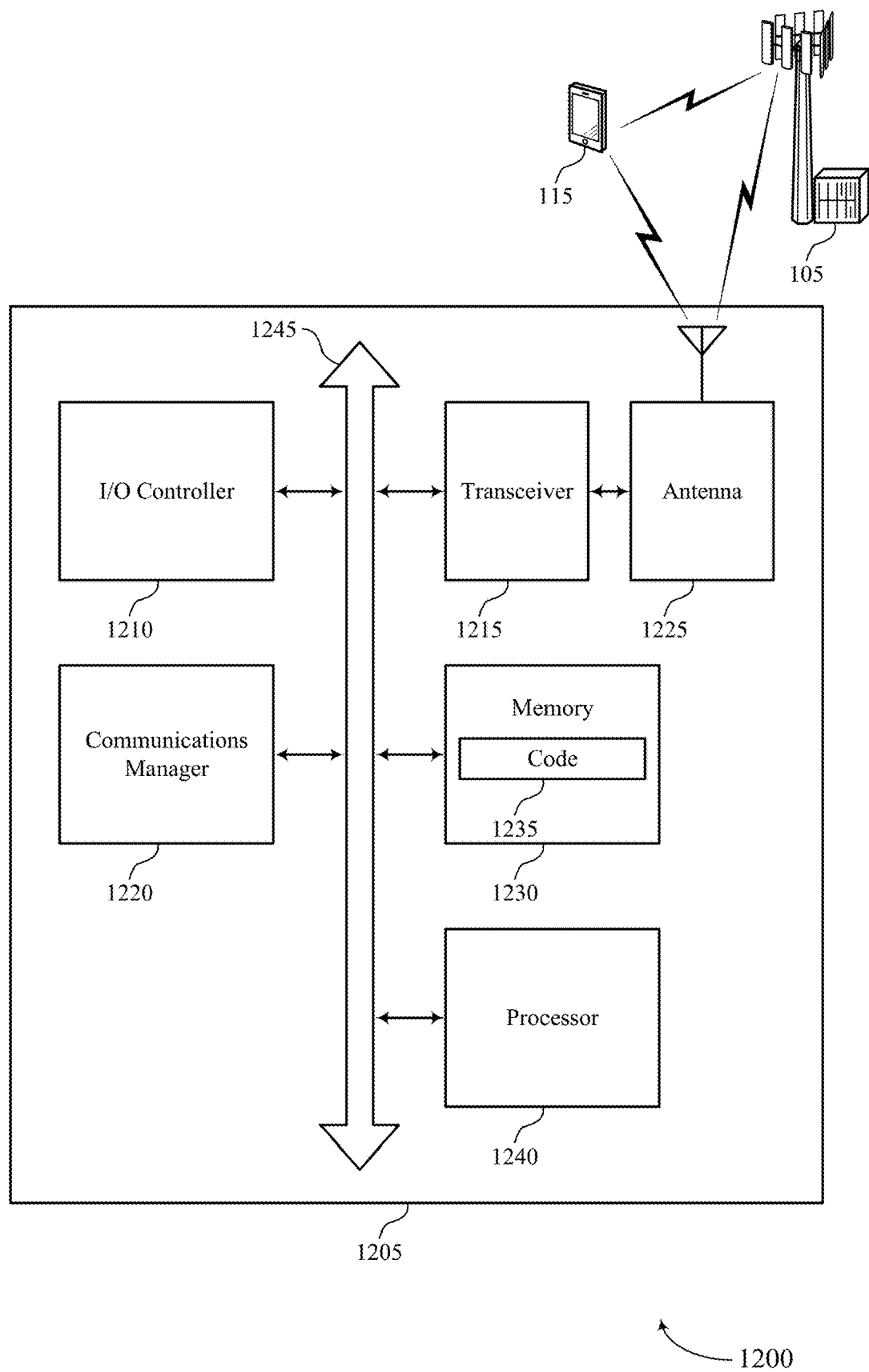
FIG. 12 shows a diagram of a system including a device that supports resolving ambiguities for search space set linking for physical downlink control channel repetition in accordance with aspects of the present disclosure.

FIG. 12 shows a diagram of a system 1200 including a device 1205 that supports resolving ambiguities for search space set linking for PDCCH repetition in accordance with aspects of the present disclosure. The device 1205 may be an example of or include the components of a device 905, a device 1005, or a UE 115 as described herein. The device 1205 may communicate wirelessly with one or more base stations 105, UEs 115, or any combination thereof. The device 1205 may include components for bi-directional voice and data communications including components for transmitting and receiving communications, such as a communications manager 1220, an input/output (I/O) controller 1210, a transceiver 1215, an antenna 1225, a memory 1230, code 1235, and a processor 1240. These components may be in electronic communication or otherwise coupled (e.g., operatively, communicatively, functionally, electronically, electrically) via one or more buses (e.g., a bus 1245).

The I/O controller 1210 may manage input and output signals for the device 1205. The I/O controller 1210 may also manage peripherals not integrated into the device 1205. In some cases, the I/O controller 1210 may represent a physical connection or port to an external peripheral. In some cases, the I/O controller 1210 may utilize an operating system such as iOS®, ANDROID®, MS-DOS®, MS-WINDOWS®, OS/2®, UNIX®, LINUX®, or another known operating system. Additionally, or alternatively, the I/O controller 1210 may represent or interact with a modem, a keyboard, a mouse, a touchscreen, or a similar device. In some cases, the I/O controller 1210 may be implemented as part of a processor, such as the processor 1240. In some cases, a user may interact with the device 1205 via the I/O controller 1210 or via hardware components controlled by the I/O controller 1210.

In some cases, the device 1205 may include a single antenna 1225. However, in some other cases, the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include random access memory (RAM) and read-only memory (ROM). The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a basic I/O system (BIOS) which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting resolving ambiguities for search space set linking for physical downlink control channel repetition). For example, the device 1205 or a component of the device 1205 may include a processor 1240 and memory 1230 coupled to the processor 1240, the processor 1240 and memory 1230 configured to perform various functions described herein.

The communications manager 1220 may support wireless communication at a UE in accordance with examples as disclosed herein. For example, the communications manager 1220 may be configured as or otherwise support a means for receiving a configuration of a first search space set and a second search space set. The communications manager 1220 may be configured as or otherwise support a means for identifying a link between the first search space set and the second search space set for PDCCH repetition. The communications manager 1220 may be configured as or otherwise support a means for identifying one or more monitoring occasions in the first search space set or the second search space set to monitor for DCI based at least in part on an overlap rule associated with the link between the first search space set and the second search space set for PDCCH repetition. The communications manager 1220 may be configured as or otherwise support a means for monitoring the identified one or more monitoring occasions in at least the first search space set or the second search space set for the DCI.

By including or configuring the communications manager 1220 in accordance with examples as described herein, the device 1205 may support techniques for resolving ambiguities due to PDCCH repetition, improving power savings, and reducing complexity at the UE.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of resolving ambiguities for search space set linking for physical downlink control channel repetition as described herein, or the processor 1240 and the memory 1230 may be otherwise configured to perform or support such operations.

Figure 13:
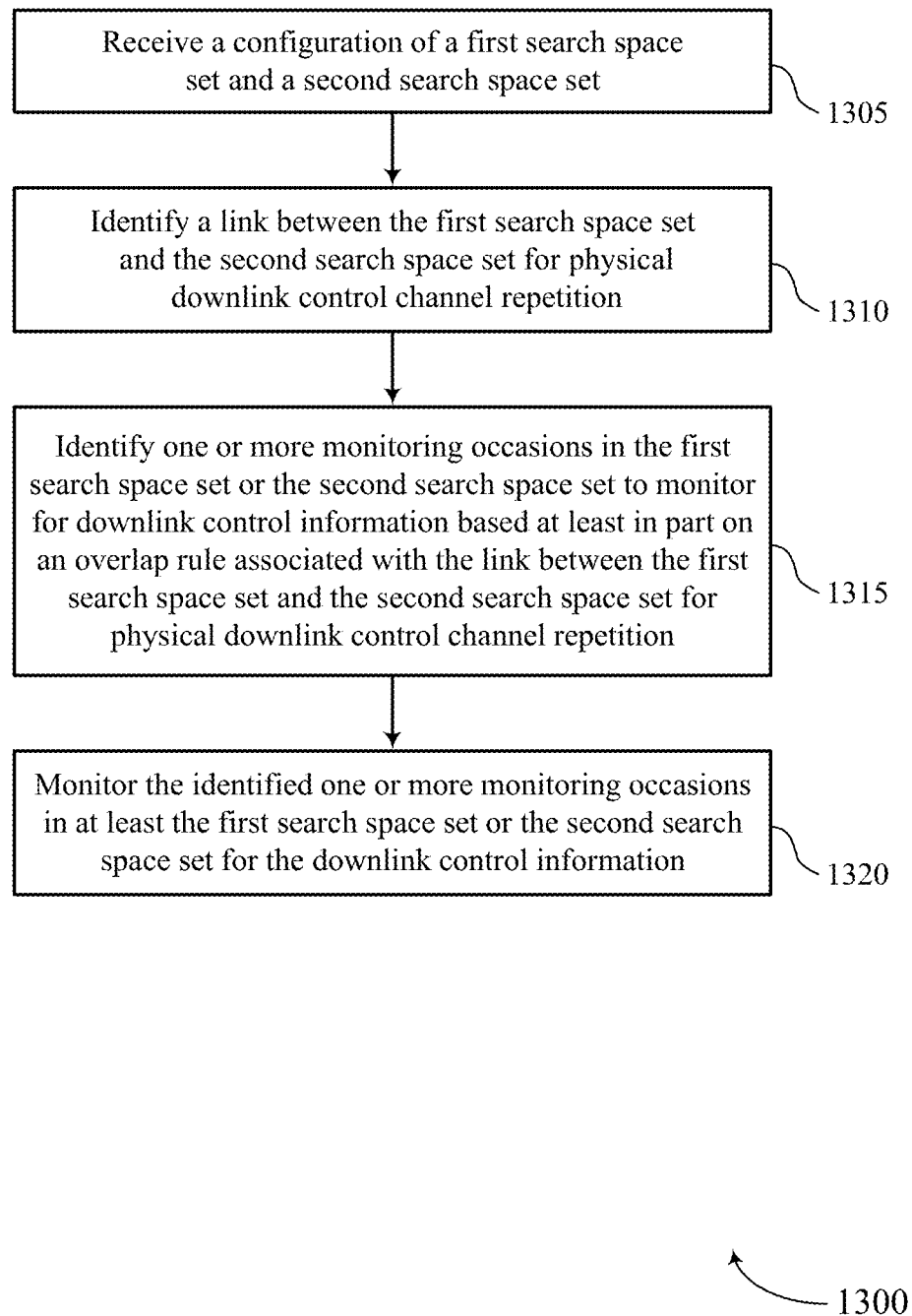
FIG. 13 shows a flowchart illustrating a method that supports resolving ambiguities for search space set linking for physical downlink control channel repetition in accordance with aspects of the present disclosure.

FIG. 13 shows a flowchart illustrating a method 1300 that supports resolving ambiguities for search space set linking for PDCCH repetition in accordance with aspects of the present disclosure. The operations of the method 1300 may be implemented by a UE or its components as described herein. For example, the operations of the method 1300 may be performed by a UE 115 as described with reference to FIGS. 1 through 12. In some examples, a UE may execute a set of instructions to control the functional elements of the UE to perform the described functions. Additionally, or alternatively, the UE may perform aspects of the described functions using special-purpose hardware.

At 1305, the method may include receiving a configuration of a first search space set and a second search space set. The operations of 1305 may be performed in accordance with examples as disclosed herein. In some examples, aspects of the operations of 1305 may be performed by a configuration manager 1125 as described with reference to FIG. 11.

At 1310, the method may include identifying a link between the first search space set and the second search space set for PDCCH repetition. The operations of 1310 may be performed in accordance with examples as disclosed herein. In some examples, aspects of the operations of 1310 may be performed by a search space manager 1130 as described with reference to FIG. 11.

At 1315, the method may include identifying one or more monitoring occasions in the first search space set or the second search space set to monitor for DCI based on an overlap rule associated with the link between the first search space set and the second search space set for PDCCH repetition. The operations of 1315 may be performed in accordance with examples as disclosed herein. In some examples, aspects of the operations of 1315 may be performed by a search space manager 1130 as described with reference to FIG. 11.

At 1320, the method may include monitoring the identified one or more monitoring occasions in at least the first search space set or the second search space set for the DCI. The operations of 1320 may be performed in accordance with examples as disclosed herein. In some examples, aspects of the operations of 1320 may be performed by a PDCCH monitor 1135 as described with reference to FIG. 11.

The following provides an overview of aspects of the present disclosure:

Aspect 1: A method for wireless communication at a UE, comprising: receiving a configuration of a first search space set and a second search space set; identifying a link between the first search space set and the second search space set for physical downlink control channel repetition; identifying one or more monitoring occasions in the first search space set or the second search space set to monitor for downlink control information based at least in part on an overlap rule associated with the link between the first search space set and the second search space set for physical downlink control channel repetition; and monitoring the identified one or more monitoring occasions in at least the first search space set or the second search space set for the downlink control information.

Aspect 2: The method of aspect 1, further comprising: determining that no monitoring occasion of the first search space set overlaps with a monitoring occasion of the second search space set based at least in part on the overlap rule.

Aspect 3: The method of aspect 1, further comprising: determining that the first search space set and the second search space set are associated with a control resource set.

Aspect 4: The method of any of aspects 1 through 3, further comprising: determining that there is no other search space set linked with the first search space set or the second search space set.

Aspect 5: The method of any of aspects 1 through 4, further comprising: identifying a third search space set having a same monitoring occasion as the first search space set; and monitoring the identified one or more monitoring occasions for the first search space set, the second search space set, and the third search space set based at least in part on the overlap rule.

Aspect 6: The method of aspect 5, wherein the overlap rule defines to monitor the identified one or more monitoring occasions for first search space set, the second search space set, and the third search space set independently.

Aspect 7: The method of any of aspects 5 through 6, further comprising: determining that the first search space set is associated with a first control resource set and the third search space set is associated with a second control resource set different from the first control resource set, wherein the overlap rule defines to monitor for the downlink control information in the first search space set and monitor for a second downlink control information in the third search space set.

Aspect 8: The method of any of aspects 5 through 7, further comprising: determining that the first search space set has a downlink control format of a first size and that the third search space set has a downlink control format of a second size different from the first size, wherein the overlap rule defines to monitor for the downlink control information in the first search space set and monitor for a second downlink control information in the third search space set.

Aspect 9: The method of any of aspects 5 through 8, further comprising: identifying a link between the third search space set and a fourth search space set for physical downlink control channel repetition; and identifying that a monitoring occasion in the second search space set overlaps with a monitoring occasion in the fourth search space set, wherein the overlap rule defines to monitor for the downlink control information in the first search space set and monitor for a second downlink control information in the third search space set.

Aspect 10: The method of any of aspects 5 through 9, wherein the first search space set and the third search space set have a same control resource set and a same downlink control format size.

Aspect 11: The method of aspect 10, wherein the third search space set is not linked with a fourth search space set.

Aspect 12: The method of any of aspects 10 through 11, wherein the overlap rule indicates to treat a downlink control information in the third search space set based on an assumption that the third search space set is linked with the second search space set.

Aspect 13: The method of any of aspects 10 through 12, further comprising: linking the third search space set with the second search space set, wherein the overlap rule indicates to treat the monitoring occasion of the second search space set as linked with the monitoring occasion of the third search space set.

Aspect 14: The method of any of aspects 10 through 13, further comprising: dropping a monitoring occasion of the third search space set, wherein the overlap rule determines to monitor a monitoring occasion of the first search space set.

Aspect 15: The method of any of aspects 10 through 14, further comprising: dropping a monitoring occasion of the first search space set, wherein the overlap rule determines to monitor a monitoring occasion of the third search space set.

Aspect 16: The method of any of aspects 10 through 15, further comprising: comparing a first index of the first search space set with a second index of the third search space set; and dropping a monitoring occasion of the first search space set or the third search space set based at least in part on the comparison, wherein the overlap rule determines to monitor the search space set based at least in part on the comparison.

Aspect 17: The method of any of aspects 10 through 16, further comprising: dropping a physical downlink control channel candidate of a monitoring occasion of the first search space set or of a monitoring occasion of the third search space set, wherein the overlap rule determines to monitor the physical downlink control channel candidate of the monitoring occasion of the first search space set or the monitoring occasion of the third search space set that is retained.

Aspect 18: The method of any of aspects 1 through 17, further comprising: determining that a monitoring occasion of the first search space set overlaps with a monitoring occasion of the second search space set; and monitoring for the downlink control information in the first search space set, wherein the overlap rule indicates to treat the monitoring occasion of the second search space set as unlinked with the monitoring occasion of the first search space set.

Aspect 19: The method of any of aspects 1 through 18, further comprising: determining that a monitoring occasion of the first search space set overlaps with a monitoring occasion of the second search space set, wherein the overlap rule determines to ignore the overlapping monitoring occasions.

Aspect 20: The method of aspect 19, wherein monitoring the downlink control information in at least the first search space set or the second search space set further comprises skipping monitoring the monitoring occasion of the first search space set and the monitoring occasion of the second search space set according to the overlap rule.

Aspect 21: The method of any of aspects 1 through 20, further comprising: dropping a physical downlink control channel candidate of a monitoring occasion of the first search space set.

Aspect 22: The method of any of aspects 1 through 21, further comprising: determining that a first physical downlink control channel candidate and a second physical downlink control channel candidate have a same downlink control information payload, a same downlink control format size, and a same radio network temporary identifier, wherein monitoring the identified one or more monitoring occasions further comprises monitoring the first physical downlink control channel candidate in the first search space set and the second physical downlink control channel candidate in the second search space set based at least in part on the determining.

Aspect 23: The method of aspect 22, further comprising: receiving a configuration of a radio resource control parameter, wherein the overlap rule is based at least in part on the radio resource control parameter.

Aspect 24: The method of any of aspects 1 through 23, further comprising: determining that a third search space set is linked with the first search space set; detecting the downlink control information in the one or more monitoring occasions; and determining scheduling information according to the overlap rule.

Aspect 25: The method of aspect 24, wherein the overlap rule is based at least in part on a last symbol of a physical downlink control channel candidate for the search space set of the first, second, or third search space sets that occurs last in time or has a higher index.

Aspect 26: The method of any of aspects 24 through 25, wherein the overlap rule is further based at least in part on the downlink control information being associated with the first search space set.

Aspect 27: The method of any of aspects 1 through 26, wherein the overlap rule skips monitoring a second monitoring occasion of the first search space set that is linked with a first monitoring occasion of the second search space set.

Aspect 28: The method of any of aspects 1 through 27, further comprising: determining that a second monitoring occasion of the first search space set is not linked with a first monitoring occasion of the second search space set based at least in part on a first monitoring occasion of the first search space set being linked with the first monitoring occasion of the second search space set.

Aspect 29: The method of any of aspects 1 through 28, further comprising: determining that a first monitoring occasion and a second monitoring occasion of the first search space set are linked with a monitoring occasion of the second search space set; detecting the downlink control information in the one or more monitoring occasions; and determining scheduling information according to the overlap rule, wherein the overlap rule is based at least in part on a last symbol of a physical downlink control channel candidate for the first monitoring occasion of the first search space set, the monitoring occasion of the second search space set, or the second monitoring occasion of the first search space set that occurs last in time.

Aspect 30: The method of aspect 29, wherein the overlap rule is further based at least in part on the detecting the downlink control information in the monitoring occasion of the second search space set.

Aspect 31: An apparatus for wireless communication at a UE, comprising a processor; memory coupled with the processor; and instructions stored in the memory and executable by the processor to cause the apparatus to perform a method of any of aspects 1 through 30.

Aspect 32: An apparatus for wireless communication at a UE, comprising at least one means for performing a method of any of aspects 1 through 30.

Aspect 33: A non-transitory computer-readable medium storing code for wireless communication at a UE, the code comprising instructions executable by a processor to perform a method of any of aspects 1 through 30.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication at a user equipment (UE), comprising:
    one or more processors;
    one or more memories coupled with the one or more processors; and
    instructions stored in the one or more memories and executable by the one or more processors to cause the apparatus to:
        receive a configuration of a first search space set and a second search space set;
        identify a link between the first search space set and the second search space set for physical downlink control channel repetition, wherein the link is provided via a radio resource control parameter included in the configuration;
        determine, based at least in part on the identified link between the first search space set and the second search space set, that there is no other search space set linked with the first search space set or the second search space set for physical downlink control channel repetition;
        identify one or more monitoring occasions in the first search space set or the second search space set to monitor for downlink control information based at least in part on an overlap rule, wherein the overlap rule is associated with the link between the first search space set and the second search space set for physical downlink control channel repetition and a third search space set; and
        monitor the identified one or more monitoring occasions in at least the first search space set or the second search space set for the downlink control information.

2. The apparatus of claim 1, wherein the instructions are further executable by the one or more processors to cause the apparatus to:
    determine that no monitoring occasion of the first search space set overlaps with a monitoring occasion of the second search space set based at least in part on the overlap rule.

3. The apparatus of claim 2, wherein the instructions are further executable by the one or more processors to cause the apparatus to:
    determine that the first search space set and the second search space set are associated with a control resource set.

4. The apparatus of claim 1, wherein the instructions are further executable by the one or more processors to cause the apparatus to:
    identify the third search space set having a same control channel element as the first search space set; and
    monitor one or more physical downlink control channel candidates for the first search space set, the second search space set, and the third search space set based at least in part on the overlap rule.

5. The apparatus of claim 4, wherein the overlap rule defines to monitor the identified one or more monitoring occasions for the first search space set, the second search space set, and the third search space set independently.

6. The apparatus of claim 4, wherein the instructions are further executable by the one or more processors to cause the apparatus to:
    determine that the first search space set is associated with a first control resource set and the third search space set is associated with a second control resource set different from the first control resource set, wherein the overlap rule defines to monitor for the downlink control information in the first search space set and monitor for a second downlink control information in the third search space set.

7. The apparatus of claim 4, wherein the instructions are further executable by the one or more processors to cause the apparatus to:
    determine that the first search space set has a downlink control format of a first size and that the third search space set has a downlink control format of a second size different from the first size, wherein the overlap rule defines to monitor for the downlink control information in the first search space set and monitor for a second downlink control information in the third search space set.

8. The apparatus of claim 4, wherein the instructions are further executable by the one or more processors to cause the apparatus to:
    identify a link between the third search space set and a fourth search space set for physical downlink control channel repetition; and
    identify that a monitoring occasion in the second search space set overlaps with a monitoring occasion in the fourth search space set, wherein the overlap rule defines to monitor for the downlink control information in the first search space set and monitor for a second downlink control information in the third search space set.

9. The apparatus of claim 4, wherein:
    the first search space set and the third search space set have a same control resource set and a same downlink control format size.

10. The apparatus of claim 9, wherein:
    the third search space set is not linked with a fourth search space set.

11. The apparatus of claim 9, wherein the instructions are further executable by the one or more processors to cause the apparatus to:
    drop at least one physical downlink control channel candidate of the third search space set, wherein the overlap rule determines to monitor at least one physical downlink control channel candidate of the first search space set.

12. The apparatus of claim 9, wherein the instructions are further executable by the one or more processors to cause the apparatus to:
   drop a monitoring occasion of the first search space set, wherein the overlap rule determines to monitor a monitoring occasion of the third search space set.

13. The apparatus of claim 9, wherein the instructions are further executable by the one or more processors to cause the apparatus to:
   compare a first index of the first search space set with a second index of the third search space set; and
   drop a monitoring occasion of the first search space set or the third search space set based at least in part on the comparison, wherein the overlap rule determines to monitor a search space set of the first search space set and the third search space set based at least in part on the comparison.

14. The apparatus of claim 9, wherein the instructions are further executable by the one or more processors to cause the apparatus to:
   drop a physical downlink control channel candidate of a monitoring occasion of the first search space set or of a monitoring occasion of the third search space set, wherein the overlap rule determines to monitor the physical downlink control channel candidate of the monitoring occasion of the first search space set or the monitoring occasion of the third search space set that is retained.

15. The apparatus of claim 1, wherein the instructions are further executable by the one or more processors to cause the apparatus to:
   determine that a monitoring occasion of the first search space set overlaps with a monitoring occasion of the second search space set; and
   monitor for the downlink control information in the first search space set, wherein the overlap rule indicates to treat the monitoring occasion of the second search space set as unlinked with the monitoring occasion of the first search space set.

16. The apparatus of claim 1, wherein the instructions are further executable by the one or more processors to cause the apparatus to:
   determine that a monitoring occasion of the first search space set overlaps with a monitoring occasion of the second search space set, wherein the overlap rule determines to ignore the overlapping monitoring occasions.

17. The apparatus of claim 16, wherein monitoring the downlink control information in at least the first search space set or the second search space set further comprises skipping monitoring the monitoring occasion of the first search space set and the monitoring occasion of the second search space set according to the overlap rule.

18. The apparatus of claim 1, wherein the instructions are further executable by the one or more processors to cause the apparatus to:
   drop a physical downlink control channel candidate of a monitoring occasion of the first search space set.

19. The apparatus of claim 1, wherein the instructions are further executable by the one or more processors to cause the apparatus to:
   determine that a first physical downlink control channel candidate and a second physical downlink control channel candidate have a same downlink control information payload, a same downlink control format size, and a same radio network temporary identifier, wherein monitoring the identified one or more monitoring occasions further comprises monitoring the first physical downlink control channel candidate in the first search space set and the second physical downlink control channel candidate in the second search space set based at least in part on the determining.

20. The apparatus of claim 1, wherein the instructions are further executable by the one or more processors to cause the apparatus to:
   detect the downlink control information in the one or more monitoring occasions; and
   determine scheduling information according to the overlap rule.

21. The apparatus of claim 20, wherein the overlap rule is based at least in part on a last symbol of a physical downlink control channel candidate for a search space set of the first search space set or the second search space set that occurs last in time or has a higher index.

22. The apparatus of claim 20, wherein the overlap rule is further based at least in part on the downlink control information being associated with the first search space set.

23. The apparatus of claim 1, wherein the overlap rule skips monitoring a second monitoring occasion of the first search space set that is linked with a first monitoring occasion of the second search space set.

24. The apparatus of claim 1, wherein the instructions are further executable by the one or more processors to cause the apparatus to:
   determine that a second monitoring occasion of the first search space set is not linked with a first monitoring occasion of the second search space set based at least in part on a first monitoring occasion of the first search space set being linked with the first monitoring occasion of the second search space set.

25. The apparatus of claim 1, wherein the instructions are further executable by the one or more processors to cause the apparatus to:
   determine that a first monitoring occasion and a second monitoring occasion of the first search space set are linked with a monitoring occasion of the second search space set;
   detect the downlink control information in the one or more monitoring occasions; and
   determine scheduling information according to the overlap rule, wherein the overlap rule is based at least in part on a last symbol of a physical downlink control channel candidate for the first monitoring occasion of the first search space set, the monitoring occasion of the second search space set, or the second monitoring occasion of the first search space set that occurs last in time.

26. The apparatus of claim 25, wherein the overlap rule is further based at least in part on the detecting the downlink control information in the monitoring occasion of the second search space set.

27. A method for wireless communication at a user equipment (UE), comprising:
   receiving a configuration of a first search space set and a second search space set;
   identifying a link between the first search space set and the second search space set for physical downlink control channel repetition, wherein the link is provided via a radio resource control parameter included in the configuration;
   determining, based at least in part on the identified link between the first search space set and the second search space set, that there is no other search space set linked with the first search space set or the second search space set for physical downlink control channel repetition;

identifying one or more monitoring occasions in the first search space set or the second search space set to monitor for downlink control information based at least in part on an overlap rule, wherein the overlap rule is associated with the link between the first search space set and the second search space set for physical downlink control channel repetition and a third search space set; and monitoring the identified one or more monitoring occasions in at least the first search space set or the second search space set for the downlink control information.

28. The method of claim 27, further comprising:
determining that no monitoring occasion of the first search space set overlaps with a monitoring occasion of the second search space set based at least in part on the overlap rule.

29. The method of claim 28, further comprising:
determining that the first search space set and the second search space set are associated with a control resource set.

30. The method of claim 27, further comprising:
identifying the third search space set having a same control channel element as the first search space set; and
monitoring one or more physical downlink control channel candidates for the first search space set, the second search space set, and the third search space set based at least in part on the overlap rule.

31. The method of claim 30, wherein the overlap rule defines to monitor the identified one or more monitoring occasions for the first search space set, the second search space set, and the third search space set independently.

32. The method of claim 30, further comprising:
determining that the first search space set is associated with a first control resource set and the third search space set is associated with a second control resource set different from the first control resource set, wherein the overlap rule defines to monitor for the downlink control information in the first search space set and monitor for a second downlink control information in the third search space set.

33. The method of claim 30, further comprising:
determining that the first search space set has a downlink control format of a first size and that the third search space set has a downlink control format of a second size different from the first size, wherein the overlap rule defines to monitor for the downlink control information in the first search space set and monitor for a second downlink control information in the third search space set.

34. The method of claim 30, further comprising:
identifying a link between the third search space set and a fourth search space set for physical downlink control channel repetition; and
identifying that a monitoring occasion in the second search space set overlaps with a monitoring occasion in the fourth search space set, wherein the overlap rule defines to monitor for the downlink control information in the first search space set and monitor for a second downlink control information in the third search space set.

35. The method of claim 30, wherein:
the first search space set and the third search space set have a same control resource set and a same downlink control format size.

36. The method of claim 35, wherein:
the third search space set is not linked with a fourth search space set.

37. The method of claim 35, further comprising:
dropping at least one physical downlink control channel candidate of the third search space set, wherein the overlap rule determines to monitor at least one physical downlink control channel candidate of the first search space set.

38. The method of claim 35, further comprising:
dropping a monitoring occasion of the first search space set, wherein the overlap rule determines to monitor a monitoring occasion of the third search space set.

39. The method of claim 35, further comprising:
comparing a first index of the first search space set with a second index of the third search space set; and
dropping a monitoring occasion of the first search space set or the third search space set based at least in part on the comparison, wherein the overlap rule determines to monitor a search space set of the first search space set and the third search space set based at least in part on the comparison.

40. The method of claim 35, further comprising:
dropping a physical downlink control channel candidate of a monitoring occasion of the first search space set or of a monitoring occasion of the third search space set, wherein the overlap rule determines to monitor the physical downlink control channel candidate of the monitoring occasion of the first search space set or the monitoring occasion of the third search space set that is retained.

41. The method of claim 27, further comprising:
determining that a monitoring occasion of the first search space set overlaps with a monitoring occasion of the second search space set; and
monitoring for the downlink control information in the first search space set,
wherein the overlap rule indicates to treat the monitoring occasion of the second search space set as unlinked with the monitoring occasion of the first search space set.

42. The method of claim 27, further comprising:
determining that a monitoring occasion of the first search space set overlaps with a monitoring occasion of the second search space set, wherein the overlap rule determines to ignore the overlapping monitoring occasions.

43. The method of claim 42, wherein monitoring the downlink control information in at least the first search space set or the second search space set further comprises skipping monitoring the monitoring occasion of the first search space set and the monitoring occasion of the second search space set according to the overlap rule.

44. The method of claim 27, further comprising:
dropping a physical downlink control channel candidate of a monitoring occasion of the first search space set.

45. The method of claim 27, further comprising:
determining that a first physical downlink control channel candidate and a second physical downlink control channel candidate have a same downlink control information payload, a same downlink control format size, and a same radio network temporary identifier, wherein monitoring the identified one or more monitoring occasions further comprises monitoring the first physical downlink control channel candidate in the first search space set and the second physical downlink control channel candidate in the second search space set based at least in part on the determining.

46. The method of claim 27, further comprising:
detecting the downlink control information in the one or more monitoring occasions; and
determining scheduling information according to the overlap rule.

47. The method of claim 46, wherein the overlap rule is based at least in part on a last symbol of a physical downlink control channel candidate for a search space set of the first search space set or the second search space set that occurs last in time or has a higher index.

48. The method of claim 46, wherein the overlap rule is further based at least in part on the downlink control information being associated with the first search space set.

49. The method of claim 27, wherein the overlap rule skips monitoring a second monitoring occasion of the first search space set that is linked with a first monitoring occasion of the second search space set.

50. The method of claim 27, further comprising:
determining that a second monitoring occasion of the first search space set is not linked with a first monitoring occasion of the second search space set based at least in part on a first monitoring occasion of the first search space set being linked with the first monitoring occasion of the second search space set.

51. The method of claim 27, further comprising:
determining that a first monitoring occasion and a second monitoring occasion of the first search space set are linked with a monitoring occasion of the second search space set;
detecting the downlink control information in the one or more monitoring occasions; and
determining scheduling information according to the overlap rule, wherein the overlap rule is based at least in part on a last symbol of a physical downlink control channel candidate for the first monitoring occasion of the first search space set, the monitoring occasion of the second search space set, or the second monitoring occasion of the first search space set that occurs last in time.

52. The method of claim 51, wherein the overlap rule is further based at least in part on the detecting the downlink control information in the monitoring occasion of the second search space set.

53. The method of claim 30, further comprising:
detecting the downlink control information in the first search space set or the second search space set; and
determining that the detected downlink control information has a first downlink control information format based at least in part on the overlap rule, wherein the first downlink control information format is associated with the first search space set and the second search space set, and wherein a second downlink control information format is associated with the third search space set.

54. The apparatus of claim 4, wherein the instructions to monitor the one or more physical downlink control channel candidates further cause the apparatus to:
detect the downlink control information in the first search space set or the second search space set; and
determine that the detected downlink control information has a first downlink control information format based at least in part on the overlap rule, wherein the first downlink control information format is associated with the first search space set and the second search space set, and wherein a second downlink control information format is associated with the third search space set.

55. The apparatus of claim 1, wherein the instructions are further executable by the one or more processors to cause the apparatus to:
receive radio resource control signaling that indicates the link between the first search space set and the second search space set and the overlap rule.

56. The apparatus of claim 1, wherein in accordance with the link, monitoring occasions with a same candidate index across the first search space set and the second search space set are linked for physical downlink control channel repetition.

57. The method of claim 27, further comprising:
receiving radio resource control signaling that indicates the link between the first search space set and the second search space set and the overlap rule.

58. The method of claim 27, wherein in accordance with the link, monitoring occasions with a same candidate index across the first search space set and the second search space set are linked for physical downlink control channel repetition.

* * * * *